United States Patent
Ke

(10) Patent No.: US 12,133,093 B2
(45) Date of Patent: Oct. 29, 2024

(54) CONTROL METHOD, TERMINAL, AND NETWORK-SIDE NETWORK ELEMENT

(71) Applicant: VIVO MOBILE COMMUNICATION CO., LTD., Guangdong (CN)

(72) Inventor: Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 774 days.

(21) Appl. No.: 17/163,607

(22) Filed: Feb. 1, 2021

(65) Prior Publication Data

US 2021/0153038 A1    May 20, 2021

Related U.S. Application Data

(63) Continuation of application No. PCT/CN2019/098551, filed on Jul. 31, 2019.

(30) Foreign Application Priority Data

Aug. 1, 2018 (CN) .......................... 201810866294.4

(51) Int. Cl.
*H04W 24/02* (2009.01)
*H04L 5/00* (2006.01)
*H04W 8/24* (2009.01)

(52) U.S. Cl.
CPC ........... *H04W 24/02* (2013.01); *H04L 5/0053* (2013.01); *H04W 8/24* (2013.01)

(58) Field of Classification Search
None
See application file for complete search history.

(56) References Cited

U.S. PATENT DOCUMENTS

| | | | |
|---|---|---|---|
| 2012/0039213 A1* | 2/2012 | Cheng | H04W 76/12 370/254 |
| 2012/0040687 A1* | 2/2012 | Siomina | G01S 5/019 455/422.1 |
| 2012/0250513 A1 | 10/2012 | De Benedittis et al. | |
| 2013/0079000 A1 | 3/2013 | Syrjarinne et al. | |
| 2013/0322370 A1* | 12/2013 | Fong | H04W 72/51 370/329 |
| 2014/0098756 A1* | 4/2014 | Tabatabaei Yazdi | H04W 74/006 370/328 |

(Continued)

FOREIGN PATENT DOCUMENTS

CA      2791855 A1    9/2011
CN    102770779 A    11/2012

(Continued)

OTHER PUBLICATIONS

Abstract of Contribution received from Lithuania, No. S2-187576, Jul. 2-6, 2018, 6 Pages.

(Continued)

*Primary Examiner* — Lonnie V Sweet
(74) *Attorney, Agent, or Firm* — Brooks Kushman P.C.

(57) ABSTRACT

This disclosure provides a control method, a terminal, and a network-side network element. The control method includes: sending first information, where the first information includes at least one of the following: indication information of whether a terminal supports capability signaling optimization, and a capability of the terminal for capability signaling optimization.

20 Claims, 8 Drawing Sheets

(56) References Cited

U.S. PATENT DOCUMENTS

| | | | |
|---|---|---|---|
| 2014/0241285 A1* | 8/2014 | Pang | H04W 74/0833 370/329 |
| 2015/0264637 A1 | 9/2015 | Zaus et al. | |
| 2016/0088526 A1 | 3/2016 | Chen et al. | |
| 2016/0150533 A1* | 5/2016 | Webb | H04W 72/044 370/329 |
| 2016/0366190 A1 | 12/2016 | Xiao | |
| 2017/0280477 A1* | 9/2017 | Martin | H04L 67/60 |
| 2017/0285621 A1 | 10/2017 | Pradas et al. | |
| 2018/0198502 A1* | 7/2018 | Kim | H04B 7/046 |
| 2018/0324778 A1* | 11/2018 | Farajidana | H04W 72/0446 |
| 2019/0110190 A1 | 4/2019 | Van Lieshout et al. | |
| 2019/0230723 A1* | 7/2019 | Kim | H04W 76/12 |
| 2019/0373452 A1 | 12/2019 | Huang et al. | |

FOREIGN PATENT DOCUMENTS

| | | |
|---|---|---|
| CN | 105764045 A | 7/2016 |
| CN | 106454804 A | 2/2017 |
| CN | 107404717 A | 11/2017 |
| CN | 107708109 A | 2/2018 |
| CN | 107980234 A | 5/2018 |
| CN | 108028752 A | 5/2018 |
| EP | 3335450 A1 | 6/2018 |
| RU | 2656359 C2 | 6/2018 |
| WO | 2016095466 A1 | 6/2016 |
| WO | 2017027057 A1 | 2/2017 |
| WO | 2017078580 A1 | 5/2017 |

OTHER PUBLICATIONS

Discussion and Decision, DISC UE capability compression through capability ID v2, R2-1804336, Apr. 16-20, 2018, 4 Pages.

Discussion and Decision, R2-1809959, Dated Jul. 2-Jul. 6, 2018, 9 Pages.

Notification of the First Office Action Application No. 2018108662944, Nov. 24, 2020, 7 Pages and 11 Pages of Translation.

The Second Office Action received from the State IP office of People's Republic of China, Application No. 201810866294, Dated May 27, 2021, 10 Pages and 13 Pages of Translation.

Written Opinion and International Search Report received for PCT/CN2019/098551, Feb. 11, 2021, 8 Pages and 6 Pages of Translation.

First Office Action for Japanese Application No. 2021-505222, dated Apr. 26, 2022, 3 Pages.

Second Office Action for Japanese Application No. 2021-505222, dated Dec. 6, 2022, 3 Pages.

First Office Action for Canadian Application No. 3,108,122, dated Nov. 24, 2022, 7 Pages.

First Office Action for Singapore Application No. 11202101023W, dated Oct. 12, 2022, 13 Pages.

Huawei et al., "Corrections on CSI-ReportingBand," 3GPP TSG-RAN WG2 AH1807, Version 15.2.1, Jul. 2-6, 2018, R1-1810889, Montreal (Quebec), Canada, 9 Pages.

Intel Corporation, "Discussion on UE Capability Signaling Optimization Scheme for NR SA," 3GPP TSG RAN #79, Agenda item 9.2.1, Mar. 19-22, 2018, RP-180438, Chennai, India, 2 Pages.

Intel: "on UE capability handling based on UE capability IDS", 3GPP Draft; S2-183159 DP UE CAPA, 3rd Generation Partnership Project (3GPP), Mobile Competence Centre; 650, Route Des Lucioles; F-06921 Sophia-Antipolis Cedex; France, vol. SA WG2, No. Sanya, P.R. China; Apr. 16, 2018-Apr. 20, 2018 Apr. 10, 2018 (Apr. 10, 2018), XP051437533, Retrieved from the Internet: URL:http://www.3gpp.org/ftp/tsg%5Fsa/WG2%5FArch/TSG%5F127%5FSanya/Docs/ [retreived on Apr. 10, 2018].

LG Electronics, NR UE Capability Size Reduction, 3GPP TSGRAN WG2 Meeting NR AH#2 (R2-1810609) Montreal, Canada, Jun. 22, 2018, (найден (Sep. 9, 2021), найден в Интернете https://www.3gpp.org/ftp/TSG_RAN/WG2_RL2/TSGR2_AHs/2018_07_NR/Docs/.

Mediatexk Inc: "UE capability compression through capability ID", 3GPP Draft; R2-1807822 Disc UE Capability Compression Through Capability ID, 3rd Generation Partnership Project (3GPP), Mobile Competence Center; 650, Route Des Lucioles; F-06921 Sophia_Antipolis CE, vol. RAN WG2, No. Busan, Korea; May 21, 2018-May 25, 2018 May 20, 2018 (May 20, 2018), XP051444163, Retrieved from the Interenet: URL: http://www.3gpp.org./ftp/Meeting%5F3GPP%5FSYNC/RAN2/Docs/ [retreived on May 20, 2018].

Russian Office Action, dated Sep. 21, 2021 issued in RU202110467907(010244).

Supplementary European Search Report, dated Jul. 26, 2021 issued in EP19843707.

First Office Action for Chinese Application No. 202111587742.5, dated Jul. 2, 2024, 10 Pages.

\* cited by examiner

CONTROL METHOD, TERMINAL, AND NETWORK-SIDE NETWORK ELEMENT

CROSS-REFERENCE TO RELATED APPLICATIONS

The present application is a continuation application of International Application No. PCT/CN2019/098551 filed on Jul. 31, 2019, which claims priority of Chinese Patent Application No. 201810866294.4 filed in China on Aug. 1, 2018, both of which are incorporated herein by reference in their entireties.

TECHNICAL FIELD

This disclosure relates to the field of communications technologies, and in particular, to a control method, a terminal, and a network-side network element.

BACKGROUND

With evolution of network technologies, a terminal needs to support an increasing quantity of capabilities, while the terminal also needs to report an increasing quantity of capabilities to a network. Therefore, air interface load caused by terminal capability reporting is increasing.

SUMMARY

According to a first aspect, an embodiment of this disclosure provides a control method, applied to a terminal and including:
  sending first information, where
  the first information includes at least one of the following: indication information of whether the terminal supports capability signaling optimization, and a capability of the terminal for capability signaling optimization.

According to a second aspect, an embodiment of this disclosure provides a control method, applied to a terminal and including:
  receiving first indication information; and
  sending at least one of the following based on the first indication information: terminal capability identification information and first information, where
  the first indication information is used to request to obtain the terminal capability identification information, and the first information includes at least one of the following: indication information of whether the terminal supports capability signaling optimization, and a capability of the terminal for capability signaling optimization.

According to a third aspect, an embodiment of this disclosure further provides a control method, applied to a network-side network element and including:
  obtaining first information, where the first information includes at least one of the following: indication information of whether a terminal supports capability signaling optimization, and a capability of the terminal for capability signaling optimization; and
  performing an operation of terminal capability signaling optimization based on the first information.

According to a fourth aspect, an embodiment of this disclosure further provides a control method, applied to a network-side network element and including:
  receiving response information for obtaining terminal capability identification information; and
  determining, based on the response information for obtaining the terminal capability identification information, whether the terminal supports capability signaling optimization, or whether the terminal has a capability for capability signaling optimization.

According to a fifth aspect, an embodiment of this disclosure further provides a control method, applied to a terminal and including:
  obtaining third information; and
  sending terminal capability identification information based on the third information, where
  the third information includes at least one of the following: indication information of whether a network supports terminal capability signaling optimization, indication information of whether a radio access network RAN network element supports terminal capability signaling optimization, and indication information of whether a core network CN network element supports terminal capability signaling optimization.

According to a sixth aspect, an embodiment of this disclosure provides a control method, applied to a network-side network element and including:
  obtaining second information; and
  sending third information based on the second information, where
  the second information includes at least one of the following: indication information of whether a RAN network element supports terminal capability signaling optimization, and indication information of whether a CN network element supports terminal capability signaling optimization; and
  the third information includes at least one of the following: indication information of whether a network supports terminal capability signaling optimization, indication information of whether the RAN network element supports terminal capability signaling optimization, and indication information of whether the CN network element supports terminal capability signaling optimization.

According to a seventh aspect, an embodiment of this disclosure further provides a terminal, including:
  a first transmission module, configured to send first information, where
  the first information includes at least one of the following: indication information of whether the terminal supports capability signaling optimization, and a capability of the terminal for capability signaling optimization.

According to an eighth aspect, an embodiment of this disclosure further provides a terminal, including:
  a first receiving module, configured to receive first indication information; and
  a second transmission module, configured to send at least one of the following based on the first indication information: terminal capability identification information and first information, where
  the first indication information is used to request to obtain the terminal capability identification information, and the first information includes at least one of the following: indication information of whether the terminal supports capability signaling optimization, and a capability of the terminal for capability signaling optimization.

According to a ninth aspect, an embodiment of this disclosure further provides a network-side network element, including:
  a first obtaining module, configured to obtain first information, where the first information includes at least one of the following: indication information of whether a terminal supports capability signaling optimization, and a capability of the terminal for capability signaling optimization; and an execution module, configured to perform an operation of terminal capability signaling optimization based on the first information.

According to a tenth aspect, an embodiment of this disclosure further provides a network-side network element, including:

a second receiving module, configured to receive response information for obtaining terminal capability identification information; and a determining module, configured to determine, based on the response information for obtaining the terminal capability identification information, whether the terminal supports capability signaling optimization, or whether the terminal has a capability for capability signaling optimization.

According to an eleventh aspect, an embodiment of this disclosure further provides a terminal, including:

a second obtaining module, configured to obtain third information; and a third transmission module, configured to send terminal capability identification information based on the third information, where the third information includes at least one of the following: indication information of whether a network supports terminal capability signaling optimization, indication information of whether a radio access network RAN network element supports terminal capability signaling optimization, and indication information of whether a core network CN network element supports terminal capability signaling optimization.

According to a twelfth aspect, an embodiment of this disclosure further provides a network-side network element, including:

a third obtaining module, configured to obtain second information; and a fourth transmission module, configured to send third information based on the second information, where the second information includes at least one of the following: indication information of whether a RAN network element supports terminal capability signaling optimization, and indication information of whether a CN network element supports terminal capability signaling optimization; and the third information includes at least one of the following: indication information of whether a network supports terminal capability signaling optimization, indication information of whether the RAN network element supports terminal capability signaling optimization, and indication information of whether the CN network element supports terminal capability signaling optimization.

According to a thirteenth aspect, an embodiment of this disclosure further provides a communications device, including a memory, a processor, and a computer program that is stored in the memory and capable of running on the processor, where when the computer program is executed by the processor, the steps of the control method applied to the terminal or the steps of the control method applied to the network-side network element may be implemented. Optionally, the communications device may be a terminal or a network-side network element.

According to a fourteenth aspect, an embodiment of this disclosure further provides a computer-readable storage medium that stores a computer program, where when the computer program is executed by a processor, the steps of the control method applied to the terminal or the steps of the control method applied to the network-side network element may be implemented.

BRIEF DESCRIPTION OF DRAWINGS

To describe the technical solutions in the embodiments of this disclosure more clearly, the following briefly describes the accompanying drawings required for the embodiments of this disclosure. Apparently, the accompanying drawings in the following description show merely some embodiments of this disclosure, and persons of ordinary skill in the art may derive other drawings from these accompanying drawings without creative efforts.

DESCRIPTION OF EMBODIMENTS

Figure 1:
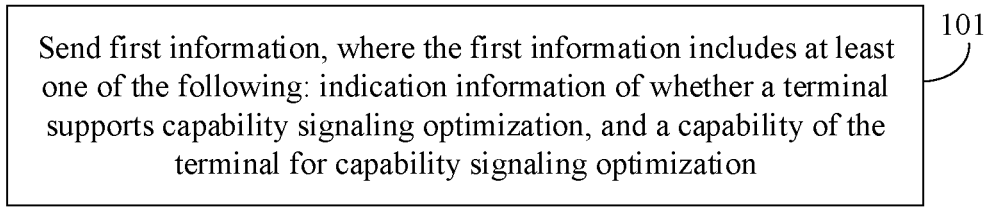
FIG. 1 is a flowchart 1 of a control method according to an embodiment of this disclosure.

First, it is noted that capabilities of a terminal may be classified into two types: a radio capability and a core network capability. For the radio capability, the terminal may report the radio capability of the terminal according to a request of a network. For the network capability, the terminal may report the network capability of the terminal during registration.

The terminal may support a plurality of bands (Band) and frequencies (frequency). With introduction of technologies such as CA (Carrier Aggregation, carrier aggregation) and DC (Dual Connectivity, dual connectivity), various possible band combinations need to be obtained through permutation and combination, and band combinations supported by various terminal manufacturers may be different, thereby resulting in an especially huge radio capability. In addition, as the network evolves, increasing features are introduced into the network, and different features usually require different wireless capabilities and network capabilities. For a related network feature, the terminal needs to notify the network of information about whether the network feature is supported.

Generally, each terminal shipped from a factory has device identification information, for example, an international mobile equipment identity (International Mobile Equipment Identity, IMEI). The IMEI may include a type allocation code (Type Allocation Code, TAC). The TAC usually includes eight digits (six digits in early days), and is a code that distinguishes a brand and a model of the terminal. The TAC is allocated by the GSMA and its authorized agencies. First two digits of the TAC are also referred to as a reporting body identifier (Reporting Body Identifier), which is a code of an authorized IMEI allocation agency. For example, 01 is the US CTIA, 35 is the British BABT, and 86 is the China TAF. The TAC can uniquely identify a same terminal model. Terminal capabilities of the same terminal model are usually the same.

The IMEI may further include a software version number (Software Version Number, SVN). The SVN may distinguish between different software versions used for terminals of a same model when the terminals are shipped from a factory. The SVN exists only in some models of some brands. Different SVNs can correspond to different terminal capabilities.

To reduce overheads caused by terminal capability reporting, identification information that can indicate a terminal capability may be set for a terminal. A method for terminal capability signaling optimization is that a terminal reports only identification information indicating a terminal capability to a network. The network may obtain the terminal capability through mapping by using the identification information indicating the terminal capability. The terminal capability identification information may be capability identification information indicating the terminal capability.

However, if the terminal reports the terminal capability identification information always after accessing the network, the terminal does not know whether the network supports capability signaling optimization, and the following problem may exist:

Problem 1: A radio access network (Radio Access Network, RAN) network element and a core network (Core Network, CN) network element may not all support a capability signaling optimization function, and the terminal does not know whether the RAN network element or the CN network element supports capability signaling optimization.

If the terminal needs to report the capability identification information each time the terminal accesses the network, specific overheads are also caused. Therefore, reporting may be performed after requesting by the network, thereby further reducing overheads and further optimizing capability signaling. However, when obtaining the terminal capability identification information, the network is not sure of whether the terminal supports capability signaling optimization, and the following problems may exist:

Problem 1: A capability signaling optimization function (for example, referred to as capability signaling optimization) of the terminal is an optional feature, and the network does not know whether the terminal currently supports the capability signaling optimization function.

Problem 2: In some special scenarios, for example, live network testing, the terminal may dynamically disable some terminal capabilities. In this case, if the capability identification information dynamically changes correspondingly, changes are reported frequently, and the network further needs to obtain, from the terminal, a terminal capability to which changed capability identification information is mapped, thereby causing a large amount of signaling overheads instead. If the capability identification information does not change, the capability identification information and the terminal capability are not in a one-to-one mapping relationship. Therefore, in some scenarios, for a terminal that supports a capability signaling optimization function, the capability signaling optimization function may be disabled. However, currently, a change of the capability signaling optimization function is not supported.

Problem 3: When a source base station does not support a capability signaling optimization function, if the terminal is handed over from the source base station to a target base station, the target base station does not know whether the terminal supports a capability signaling optimization function, or whether the capability identification information of the terminal can be obtained.

In the embodiments of this disclosure, terminal capability identification information may be used to identify the terminal capability. There is a mapping relationship between the terminal capability identification information and terminal capability information, and the terminal capability may be obtained through mapping by using the terminal capability identification information. A set of terminal capabilities or a complete terminal capability may be obtained through mapping by using the terminal capability identification information. Because a size of the terminal capability identification information is smaller than that of the terminal capability, an effect of saving capability signaling optimization can be achieved.

Optionally, one terminal may have one or more pieces of terminal capability identification information.

In the embodiments of this disclosure, a serving network is a network that provides access for a terminal, and may be an operator network or a dedicated network, or may be a public communications network or a private communications network. Optionally, an identifier of the serving network may be a PLMN identifier or another identifier (for example, an identifier configured by the private communications network).

In the embodiments of this disclosure, a network type may include but is not limited to at least one of the following: a communications network type, a radio access technology type, a radio access network type, and a network generation.

Optionally, the communications network type may include but is not limited to at least one of the following: GSM, EDGE, GPRS, GSM-CS, GSM-PS, CS, PS, CDMA, 3GPP2 1×CS, EPS, and 5GS.

Optionally, the radio access technology type may include but is not limited to at least one of the following: GERAN, GERAN-CS, GERAN-PS, EDGE, UTRA, TD-SCDMA, WCDMA, HSPA, CDMA, CDMA 2000, 3GPP2 1×CS, cdma2000-1×RTT, EUTRA, LTE FDD, LTE TDD, 3GPP, N3GPP, 3GPP2, WLAN, NB IoT, NG RAN, EUTRA-NR, and NR.

Optionally, the radio access network type may include but is not limited to at least one of the following: GERAN, GERAN-CS, GERAN-PS, EDGE, UTRAN, TD-SCDMA, WCDMA, HSPA, CDMA, CDMA 2000, 3GPP2 1×CS, cdma2000-1×RTT, EUTRAN, LTE FDD, LTE TDD, 3GPP, N3GPP, 3GPP2, WLAN, NB IoT, NG RAN, EUTRA-NR, and NR.

Optionally, the network generation may include but is not limited to at least one of the following: a 2G network, a 3G network, a 4G network, and a 5G network.

In the embodiments of this disclosure, a terminal capability may include at least one of the following: a UE core network capability and a terminal radio capability. The UE core network capability may also be referred to as a UE network capability or a non-access stratum (NAS) capability.

Optionally, the terminal radio capability may include at least one of the following: a carrier aggregation CA capability and a dual connectivity DC capability.

Optionally, the UE core network capability may include at least one of the following: a 5G session management capability, a 5G mobility management capability, a user equipment network capability (UE Network capability), a mobile station network capability (MS Network capability), and the like.

Optionally, the UE network capability may include at least one of the following: a 5G network capability, a 4G network capability (for example, a UE Network capability), a 3G network capability (for example, an MS Network capability), and the like.

In the embodiments of this disclosure, "capability" and "terminal capability" may express a same meaning, and may be used interchangeably.

In the embodiments of this disclosure, "capability identification information" and "terminal capability identification information" may express a same meaning, and may be used interchangeably.

In the embodiments of this disclosure, "card" may be, but is not limited to, one of the following: a UICC (Universal Integrated Circuit Card), a SIM (Subscriber Identity Module), an eSIM, and an eUICC. The card may be a physical card. Further, an $N^{th}$ card may mean that a card of a serving network is placed in an $N^{th}$ card slot. A primary card may mean that the card of the serving network is placed in a primary card slot. A secondary card may mean that the card of the serving network is placed in a secondary card slot. Card location information may also be referred to as card slot information.

The card may be alternatively an electronic card. The serving network may configure a plurality of cards for a terminal.

In the embodiments of this disclosure, terminal capability signaling optimization may include radio capability signaling optimization and non-access stratum capability signaling optimization. Optionally, the radio capability signaling optimization may also be referred to as optimizations on UE radio capability signaling, RACS for short. However, it should be noted that a standards organization may define other names, and the embodiments of this disclosure are not affected by the names.

In the embodiments of this disclosure, optionally, whether capability signaling optimization is supported may also be referred to as whether a capability for capability signaling optimization is available.

Optionally, supporting capability signaling optimization may also be referred to as: being capable of capability signaling optimization, having a capability for capability signaling optimization, or that capability signaling optimization is enabled.

Optionally, not supporting capability signaling optimization may also be referred to as: being incapable of capability signaling optimization, not having a capability for capability signaling optimization, or that capability signaling optimization is disabled.

Optionally, obtaining may be understood as obtaining from a configuration, obtaining through receiving, obtaining through receiving after requesting is performed, or obtaining through processing based on received information. This may be specifically determined according to actual needs, and is not limited in the embodiments of this disclosure.

The following clearly and completely describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

In the embodiments of this disclosure, a network element may be one of the following: a physical device, a network function entity, and a network unit.

In the embodiments of this disclosure, a core-network network element (CN network element) may include, but is not limited to, at least one of the following: a core network device, a core network node, a core network function, a core-network network element, a mobility management entity (Mobility Management Entity, MME), an access management function (Access Management Function, AMF), a session management function (Session Management Function, SMF), a user plane function (User Plane Function, UPF), a serving gateway (serving GW, SGW), a PDN gateway (PDN Gate Way, PDN gateway), a policy control function (Policy Control Function, PCF), a policy and charging rules function (Policy and Charging Rules Function, PCRF) unit, a serving GPRS support node (Serving GPRS Support Node, SGSN), a gateway GPRS support node (Gateway GPRS Support Node, GGSN), and a radio access network device.

In the embodiments of this disclosure, a radio-access-network network element (RAN network element) may include but is not limited to at least one of the following: a radio access network device, a radio access network node, a radio access network function, a radio access network unit, a 3GPP radio access network, a non-3GPP radio access network, a centralized unit (Centralized Unit, CU), a distributed unit (Distributed Unit, DU), a base station, an evolved NodeB (evolved Node B, eNB), a 5G base station (gNB), a radio network controller (Radio Network Controller, RNC), a NodeB (NodeB), a non-3GPP interworking function (non-3GPP Inter Working Function, N3IWF), an access controller (Access Controller, AC) node, an access point (Access Point, AP) device, or a wireless local area network (Wireless Local Area Networks, WLAN) node.

The base station may be a base transceiver station (BTS, Base Transceiver Station) in Global System for Mobile Communications (GSM) or Code Division Multiple Access (CDMA), or may be a NodeB (NodeB) in WCDMA, or may be an evolved NodeB (eNB or e-NodeB, evolved Node B) in LTE or a 5G base station (gNB). This is not limited in the embodiments of this disclosure.

In the embodiments of this disclosure, a network-side network element may include at least one of the following: a CN network element and a RAN network element.

In the embodiments of this disclosure, a terminal may include a relay that supports a terminal function. The terminal may also be referred to as a terminal device or user equipment (User Equipment, UE). The terminal may be a terminal side device such as a mobile phone, a tablet personal computer (Tablet Personal Computer), a laptop computer (Laptop Computer), a personal digital assistant (Personal Digital Assistant, PDA), a mobile internet device (Mobile Internet Device, MID), a wearable device (Wearable Device), or an in-vehicle device. It should be noted that the specific type of the terminal is not limited in the embodiments of this disclosure.

In the embodiments of this disclosure, it should be noted that a capability for capability signaling optimization of a terminal and other terminal capabilities are independently defined capability information elements (IE). The terminal reports a capability for capability signaling optimization, and a network may decide, based on a capability for capability signaling optimization, whether to allocate capability identification information or whether to obtain capability identification information from the terminal.

For a reporting manner of the terminal, the terminal may actively perform reporting, and the network indicates whether the terminal supports capability signaling optimization; or the terminal may perform reporting after requesting by the network, and the network decides, based on whether the terminal supports capability signaling optimization, whether to obtain the capability identification information from the terminal. After the terminal disables the capability signaling optimization function, the network may update information about a capability of the terminal for capability signaling optimization, delete or suspend the capability identification information of the terminal, and perform synchronization to other network elements.

As shown in FIG. 1, an embodiment of this disclosure provides a control method, applied to a terminal (including a relay with a terminal capability). The method may include the following steps.

Step 101: Send first information, where the first information includes at least one of the following: indication information of whether the terminal supports capability signaling optimization, and a capability of the terminal for capability signaling optimization.

It can be understood that the indication information of whether the terminal supports capability signaling optimization may be specifically information used to indicate whether the terminal supports capability signaling optimization. The indication information of whether the terminal supports capability signaling optimization may be embodied as whether the terminal has a capability for capability signaling optimization.

It should be noted that, when sending the first information, the terminal may send the first information to a network-side network element, for example, a RAN network element and/or a CN network element, so that the network-side network element learns of whether the terminal supports capability signaling optimization. When sending the first information, the terminal may actively send the first information, for example, may actively send the first information when accessing a network, or send the first information after requesting by the network.

Optionally, step 101 may include:
sending, by the terminal, the first information when meeting a predetermined condition, where the predetermined condition may include at least one of the following:
the terminal supports capability signaling optimization, the terminal changes from supporting capability signaling optimization to not supporting capability signaling optimization, the terminal changes from not supporting capability signaling optimization to supporting capability signaling optimization, the terminal has a capability for capability signaling optimization, a capability for capability signaling optimization the terminal changes, the terminal receives request information for obtaining a capability for capability signaling optimization, a capability of the terminal for capability signaling optimization is enabled, and a capability of the terminal for capability signaling optimization is disabled.

In an implementation, the terminal may send the first information to at least one of the following: the CN network element, the RAN network element, an AMF, an MME, and a capability management function.

It can be understood that, in this embodiment of this disclosure, the first information is sent, so that the network-side network element can learn of whether the terminal supports capability signaling optimization, and the terminal may optimize to-be-reported terminal capability signaling when supporting capability signaling optimization, thereby avoiding reporting an entirety of terminal capability information and reducing overheads caused by terminal capability reporting.

In this embodiment of this disclosure, when the terminal reports a capability, in addition to the active reporting described in the embodiment of FIG. 1, the terminal may alternatively perform reporting according to a network request, as described in the following embodiment of FIG. 2.

Figure 2:
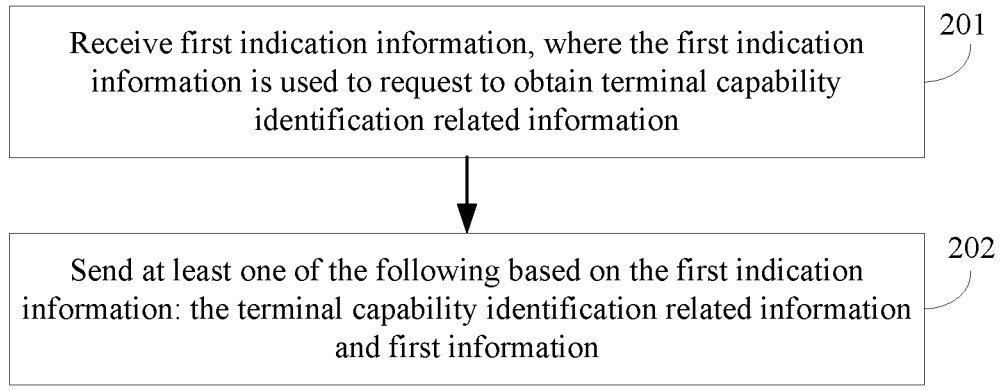
FIG. 2 is a flowchart 2 of a control method according to an embodiment of this disclosure.

As shown in FIG. 2, an embodiment of this disclosure further provides a control method, applied to a terminal (including a relay with a terminal capability). The method may include the following steps.

Step 201: Receive first indication information, where the first indication information is used to request to obtain terminal capability identification information.

In an implementation, the terminal may receive the first indication information from at least one of the following: a CN network element, a RAN network element, an AMF, an MME, and a capability management function.

Step 202: Send at least one of the following based on the first indication information: the terminal capability identification information and first information.

The first information may include at least one of the following: indication information of whether the terminal supports capability signaling optimization, and a capability of the terminal for capability signaling optimization. It can be understood that the indication information of whether the terminal supports capability signaling optimization may be specifically information used to indicate whether the terminal supports capability signaling optimization.

In this embodiment of this disclosure, optionally, the first indication information may include at least one of the following:
indication information of whether to obtain capability identification information, type information of the capability identification information, indication information of whether to obtain the capability identification information and terminal capability information, and indication information of whether to obtain the terminal capability information.

Further, the type information of the capability identification information may include at least one of the following: information of a card slot corresponding to the capability identification information, information of a card corresponding to the capability identification information, information of a serving network corresponding to the capability identification information, and network type information of the capability identification information.

Further, the information of the card slot corresponding to the capability identification information may include at least one of the following: identification information of a card slot, a serial number of the card slot, information of a first card slot, information of a second card slot, indication information of a primary card slot or a secondary card slot, indication information of whether a capability is applicable to all card slots, and indication information of whether a capability is indiscriminate between card slots.

It can be understood that, in specific implementation, the first card slot may be a card slot corresponding to a primary card of the terminal, and the second card slot may be a card slot corresponding to a secondary card of the terminal. In an implementation, the card slot information of the terminal may be further distinguished as card slot information of the primary card and card slot information of the secondary card. It is not difficult to understand that information of a card slot corresponding to a capability can assist the network in obtaining, through mapping, a terminal capability corresponding to the terminal in a corresponding card slot.

Further, the information of the card corresponding to the capability identification information may include at least one of the following: a serial number of a card, a serial number of a card slot in which the card is located, indication information of a primary card or a secondary card, indication information of whether a capability is applicable to all cards, and indication information of whether a capability is indiscriminate between cards. It is not difficult to understand that the information of the card corresponding to the capability identification information can assist the network in obtaining, through mapping, a terminal capability corresponding to the terminal with a corresponding card.

Further, the information of the serving network corresponding to the capability identification information may include at least one of the following: network identification information of a serving network, indication information of whether capability identification is applicable to all serving networks, and indication information of whether the capability identification information is indiscriminate between serving networks. Further, the network identification information may include a public communications network identifier (for example, a PLMN) and a private communications network identifier (for example, a Type A network identifier or a Type B network identifier).

It is not difficult to understand that the network identification information can assist the network in obtaining, through mapping, terminal capabilities corresponding to the terminal in different networks. For example, for a same terminal, when the terminal roams and accesses a home network, terminal capabilities may be different; and for different terminals of a same model, when the terminals access a same network, one terminal is roaming, and another terminal is accessing a home network, terminal capabilities may be the same. For another example, when a radio access network is shared to a plurality of operator networks, the radio access network may learn of, based on network identification information, a network capability that the terminal needs to access. For another example, in an equivalent network, when the network identification information (for example, the PLMN) of the terminal changes, the terminal may be mapped to different terminal capabilities.

Further, the network type information corresponding to the capability identification information may include at least one of the following: a network type, indication information of whether a capability is applicable to all network types, and indication information of whether a capability is indiscriminate between network types. The network type information may indicate a capability of a network type currently supported by the terminal or a capability of a network type not supported by the terminal.

It is not difficult to understand that, with the network type information, the network may obtain, through mapping, terminal capabilities of the terminal in different types of networks. For example, for different terminals of a same model, one terminal is data centric and may enable a 5G network capability; and another terminal is voice centric (voice centric), and may disable a 5G network capability when confirming that a 5G network does not support voice.

In this embodiment of this disclosure, optionally, the terminal capability identification information may include at least one of the following:

terminal capability identification information, type information of capability identification information, and terminal capability information to which the capability identification information is mapped. In an implementation, the type information of the capability identification information may be alternatively embodied as application scope information of the capability identification information.

The terminal capability identification information may include at least one of the following:

terminal model information, capability indication auxiliary information, and a terminal capability identifier. In another embodiment of this disclosure, optionally, the sending the terminal capability identification information based on the first indication information in step 202 may include at least one of the following:

when the indication information of whether to obtain the capability identification information indicates to obtain the capability identification information, sending the terminal capability identification information and/or a terminal capability to which the terminal capability identification information is mapped;

when the indication information of whether to obtain the capability identification information indicates not to obtain the capability identification information, sending the terminal capability information;

when the indication information of whether to obtain the capability identification information and the terminal capability information indicates to obtain the capability identification information and the terminal capability information, sending the terminal capability identification information and/or the terminal capability information;

sending, based on the type information of the capability identification information, the terminal capability identification information corresponding to the type information of the capability identification information; or when the indication information of whether to obtain the terminal capability information indicates to obtain the terminal capability information, sending the terminal capability information and/or the terminal capability identification information to which the terminal capability information is mapped.

It can be understood that, in this embodiment of this disclosure, the terminal capability identification information and/or the first information are/is sent according to a network request, so that a network-side network element can learn of whether the terminal supports capability signaling optimization, and the terminal may optimize to-be-reported terminal capability signaling when supporting capability signaling optimization, thereby avoiding reporting an entirety of terminal capability information and reducing overheads caused by terminal capability reporting.

Figure 3:
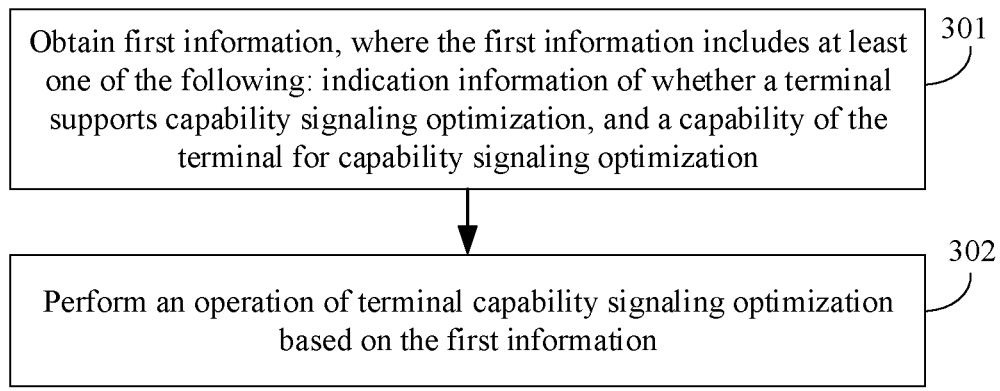
FIG. 3 is a flowchart 3 of a control method according to an embodiment of this disclosure.

As shown in FIG. 3, an embodiment of this disclosure further provides a control method, applied to a network-side network element. The method may include the following steps.

Step 301: Obtain first information, where the first information includes at least one of the following: indication information of whether a terminal supports capability signaling optimization, and a capability of the terminal for capability signaling optimization.

In an implementation, the network-side network element may include at least one of the following: a CN network element, a RAN network element, an AMF, an MME, and a capability management function.

Step 302: Perform an operation of terminal capability signaling optimization based on the first information.

Optionally, the performing an operation of terminal capability signaling optimization may include at least one of the following:

allocating terminal capability identification information to the terminal;

sending first indication information to a first target end, where the first indication information is used to request to obtain terminal capability identification information, where optionally, the first target end is the terminal;

deleting or suspending terminal capability identification information;

resuming terminal capability identification information for the terminal;

sending indication information for deleting or suspending terminal capability identification information to a second target end, where the second target end is the network-side network element or the terminal that has stored the terminal capability identification information; or sending the first information to a third target end, where the third target end is another network-side network element different from the network-side network element that performs sending.

Further, optionally, the allocating terminal capability identification information to the terminal includes:

when the terminal meets a first condition, allocating the terminal capability identification information to the terminal; and/or the sending indication information for obtaining terminal capability identification information to a first target end includes:

when the terminal meets a first condition, sending the indication information for obtaining the terminal capability identification information to the first target end; and/or the deleting or suspending terminal capability identification information includes:

when the terminal meets a second condition, deleting or suspending the terminal capability identification information; and/or the sending indication information for deleting or suspending terminal capability identification information to a second target end includes:

when the terminal meets a second condition, sending the indication information for deleting or suspending the terminal capability identification information to the second target end; and/or the resuming terminal capability identification information for the terminal includes:

when the terminal meets a third condition, resuming the terminal capability identification information for the terminal; and/or the sending the first information to a third target end includes:

when the terminal meets a fourth condition, sending the first information to the third target end, where the first condition may include at least one of the following: the terminal supports capability signaling optimization, the terminal has a capability for capability signaling optimization, no terminal capability identification information exists, a capability of the terminal for capability signaling optimization changes from being not supported to being supported, and a capability of the terminal for capability signaling optimization is enabled;

the second condition may include at least one of the following: a capability of the terminal for capability signaling optimization changes from being supported to being not supported, and a capability of the terminal for capability signaling optimization is disabled;

the third condition may include at least one of the following: a capability of the terminal for capability signaling optimization changes from being not supported to being supported, and a capability of the terminal for capability signaling optimization is enabled; and the fourth condition may include at least one of the following: the terminal supports capability signaling optimization, the terminal has a capability for capability signaling optimization, and a capability of the terminal for capability signaling optimization changes.

It can be understood that, in this embodiment of this disclosure, the network-side network performs the operation of terminal capability signaling optimization based on the first information, so that the terminal may optimize to-be-reported terminal capability signaling when supporting capability signaling optimization, thereby avoiding reporting an entirety of terminal capability information and reducing overheads caused by terminal capability reporting.

Figure 4:
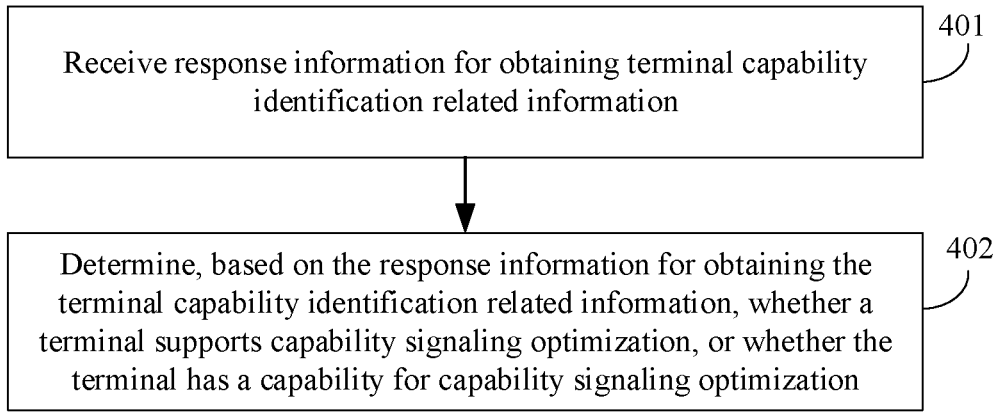
FIG. 4 is a flowchart 4 of a control method according to an embodiment of this disclosure.

As shown in FIG. 4, an embodiment of this disclosure further provides a control method, applied to a network-side network element. The method may include the following steps.

Step 401: Receive response information for obtaining terminal capability identification information.

In an implementation, the network-side network element may include at least one of the following: a CN network element, a RAN network element, an AMF, an MME, and a capability management function.

In an implementation, the network-side network element may receive, from a source end, the response information for obtaining the terminal capability identification information. When the network-side network element is the CN network element, the source end may be at least one of the following: a RAN network element and a terminal. When the network-side network element is the RAN network element, the source end may be at least one of the following: a terminal and a CN network element.

Step 402: Determine, based on the response information for obtaining the terminal capability identification information, whether the terminal supports capability signaling optimization, or whether the terminal has a capability for capability signaling optimization.

Optionally, the response information for obtaining the terminal capability identification information may include at least one of the following:

terminal capability identification information and terminal capability information.

The terminal capability identification information may include at least one of the following:

terminal model information, capability indication auxiliary information, and a terminal capability identifier.

Optionally, before step 401, the method may further include:

sending request information for obtaining the terminal capability identification information.

Optionally, the determining whether the terminal supports capability signaling optimization, or whether the terminal has a capability for capability signaling optimization in step 402 may include:

when the response information for obtaining the terminal capability identification information includes the terminal capability identification information, determining that the terminal supports capability signaling optimization or has a capability for capability signaling optimization; or when the response information for obtaining the terminal capability identification information does not include the terminal capability identification information, determining that the terminal does not support capability signaling optimization or does not have a capability for capability signaling optimization.

For example, in an implementation, assuming that the RAN network element requests the terminal to return a terminal identifier ID, if the terminal returns the terminal capability information, it indicates that the terminal does not support capability signaling optimization; or if the terminal returns the terminal ID, it indicates that the terminal supports capability signaling optimization.

In another implementation, if the terminal supports capability signaling optimization, the terminal may perform reporting according to a request; or if the terminal does not support capability signaling optimization, the terminal may ignore a request, and directly report the terminal capability information.

It can be understood that, in this embodiment of this disclosure, the response information of the terminal can assist the network in learning of whether the terminal supports capability signaling optimization.

In this embodiment of this disclosure, in addition to the foregoing manner of reporting a terminal capability, the terminal may alternatively actively report the capability identification information to report a terminal capability, as described in the following embodiment.

Figure 5:
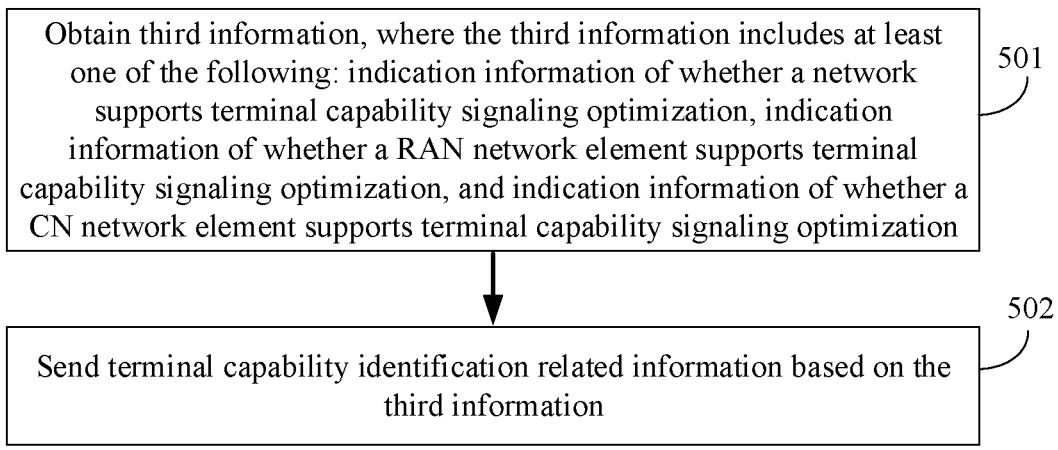
FIG. 5 is a flowchart 5 of a control method according to an embodiment of this disclosure.

As shown in FIG. 5, an embodiment of this disclosure further provides a control method, which may be applied to a terminal (including a relay with a terminal capability). The method may include the following steps.

Step 501: Obtain third information, where the third information includes at least one of the following: indication information of whether a network supports terminal capability signaling optimization, indication information of whether a RAN network element supports terminal capability signaling optimization, and indication information of whether a CN network element supports terminal capability signaling optimization.

In an implementation, the terminal may obtain the third information from at least one of the following: the CN network element, the RAN network element, an AMF, an MME, and a capability management function.

The obtaining in step 501 may be understood as obtaining from a configuration, obtaining through receiving, obtaining through receiving after requesting is performed, or obtaining through processing based on received information. This may be specifically determined according to actual needs, and is not limited in this embodiment of this disclosure.

Optionally, when the indication information of whether the network supports terminal capability signaling optimization indicates that the network supports terminal capability signaling optimization, that the network supports terminal capability signaling optimization may include any one of the following: the RAN network element supports terminal capability signaling optimization, the CN network element supports terminal capability signaling optimization, and both the RAN network element and the CN network element support terminal capability signaling optimization.

Step 502: Send terminal capability identification information based on the third information.

In an implementation, the terminal may send the terminal capability identification information to at least one of the following: the CN network element, the RAN network element, the AMF, the MME, and the capability management function.

It can be understood that, when the third information includes information indicating that the network supports terminal capability signaling optimization, the terminal may report the terminal capability identification information. When the third information includes indication information that the RAN network element supports terminal capability signaling optimization, the terminal may report the terminal capability identification information to the RAN network element according to a requirement. When the third information includes indication information that the CN network element supports terminal capability signaling optimization, the terminal may report the terminal capability identification information to the CN network element according to a requirement.

In this embodiment of this disclosure, optionally, the terminal capability identification information may include at least one of the following:

terminal capability identification information, type information of capability identification information, and terminal capability information to which the capability identification information is mapped. In an implementation, the type information of the capability identification information may be alternatively embodied as application scope information of the capability identification information.

Optionally, the terminal capability identification information may include at least one of the following: terminal model information, capability indication auxiliary information, and a terminal capability identifier.

In an implementation, the terminal capability identification information may include the terminal model information and the capability indication auxiliary information.

In an implementation, the terminal capability identification information may include the terminal capability identifier.

In an implementation, the terminal capability identification information may include the terminal capability identifier and the capability indication auxiliary information. In this case, the capability indication auxiliary information may be used to indicate an application scope of the capability identifier.

Optionally, the terminal model information may include at least one of the following: a terminal manufacturer identifier, a type allocation code (for example, a TAC), and a software version number (for example, an SVN).

Optionally, the capability indication auxiliary information may include at least one of the following: information of a card slot corresponding to a capability, information of a card corresponding to the capability (for example, card information of a physical card, or card information of an electronic card), information of a serving network corresponding to the capability, network type information corresponding to the capability, and capability type indication information.

Further, the information of the card slot corresponding to the capability may include at least one of the following: identification information of a card slot, a serial number of the card slot, information of a first card slot, information of a second card slot, indication information corresponding to a primary card slot or a secondary card slot, indication information of whether the capability is applicable to all card slots, and indication information of whether the capability is indiscriminate between card slots. It can be understood that, in specific implementation, the first card slot may be a card slot corresponding to a primary card of the terminal, and the second card slot may be a card slot corresponding to a secondary card of the terminal.

Further, the information of the card corresponding to the capability may include at least one of the following: a serial number of a card, a serial number of a card slot in which the card is located, an indication of a primary card or a secondary card, indication information of whether the capability is applicable to all cards, and indication information of whether the capability is indiscriminate between cards. It is not difficult to understand that the information of the card corresponding to the capability can assist the network in obtaining, through mapping, a terminal capability corresponding to the terminal with a corresponding card.

Further, the information of the serving network corresponding to the capability may include at least one of the following: network identification information of a serving network, indication information of whether the capability is applicable to all serving networks, and indication information of whether the capability is indiscriminate between serving networks. Further, the network identification information may include a public communications network identifier (for example, a PLMN) and a private communications network identifier (for example, a Type A network identifier or a Type B network identifier).

Further, the network type information corresponding to the capability may include at least one of the following: a network type, indication information of whether the capability is applicable to all network types, and indication information of whether the capability is indiscriminate between network types. The network type information may indicate a capability of a network type currently supported by the terminal or a capability of a network type not supported by the terminal.

It can be understood that, in this embodiment of this disclosure, the terminal capability identification information is sent based on the third information, so that the terminal may optimize to-be-reported terminal capability signaling when learning that the network supports terminal capability signaling optimization, thereby avoiding reporting an entirety of terminal capability information and reducing overheads caused by terminal capability reporting. When the network does not support terminal capability signaling optimization, the terminal may not report capability identification information, and does not enable a capability identification information reporting policy, thereby reducing overheads of the terminal.

Figure 6:
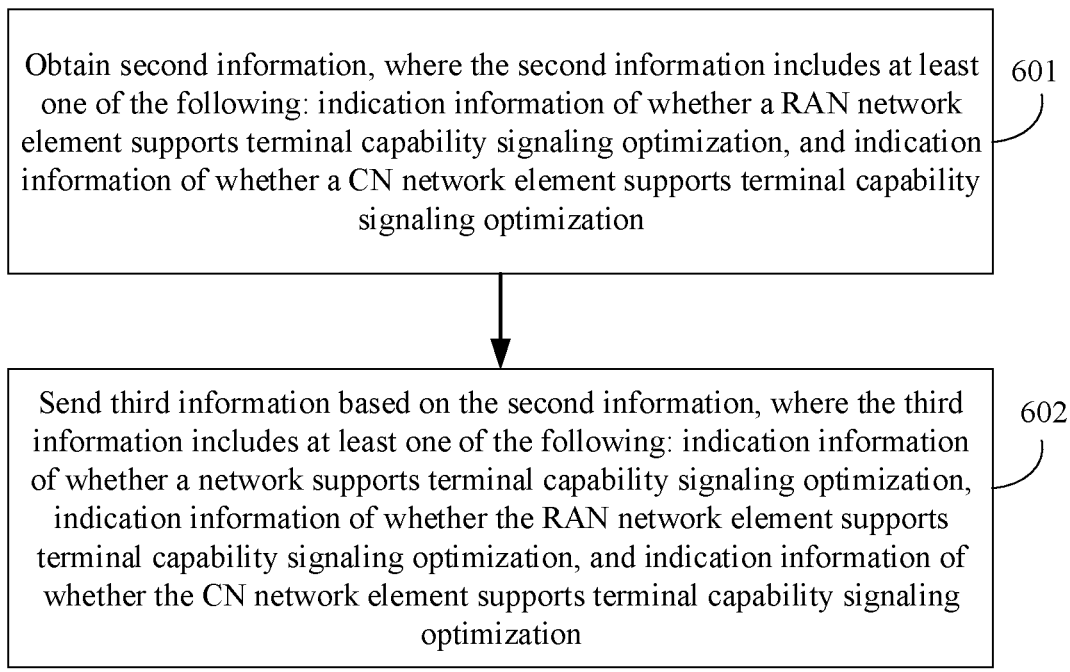
FIG. 6 is a flowchart 6 of a control method according to an embodiment of this disclosure.

As shown in FIG. 6, an embodiment of this disclosure further provides a control method, applied to a network-side network element. The method may include the following steps.

Step 601: Obtain second information, where the second information includes at least one of the following: indication information of whether a RAN network element supports terminal capability signaling optimization, and indication information of whether a CN network element supports terminal capability signaling optimization.

In an implementation, the network-side network element may include at least one of the following: the CN network element, the RAN network element, an AMF, an MME, and a capability management function.

In an implementation, the network-side network element may receive the second information from a source end. When the network-side network element is the CN network element, the source end may be the RAN network element. When the network-side network element is the RAN network element, the source end may be the CN network element.

The obtaining in this step may be understood as obtaining from a configuration, obtaining through receiving, obtaining through receiving after requesting is performed, or obtaining through processing based on received information. This may be specifically determined according to actual needs, and is not limited in this embodiment of this disclosure.

Step 602: Send third information based on the second information, where the third information includes at least one of the following: indication information of whether a network supports terminal capability signaling optimization, indication information of whether the RAN network element supports terminal capability signaling optimization, and indication information of whether the CN network element supports terminal capability signaling optimization.

It can be understood that the second information and the third information may be the same, or may be different.

Optionally, when the indication information of whether the network supports terminal capability signaling optimization indicates that the network supports terminal capability signaling optimization, that the network supports terminal capability signaling optimization may include any one of the following: the RAN network element supports terminal capability signaling optimization, the CN network element supports terminal capability signaling optimization, and both the RAN network element and the CN network element support terminal capability signaling optimization.

Optionally, when the network-side network element is the RAN network element, the RAN network element may send the third information by using a broadcast message; or when the network-side network element is the RAN network element, the RAN network element may obtain, from the CN network element, indication information of whether the CN network element supports terminal capability signaling optimization; or when the network-side network element is the CN network element, the CN network element may send the third information to a terminal during access of the terminal. In an implementation, the CN network element sends the third information to the terminal only when both the CN network element and the RAN network element support terminal capability signaling optimization.

It can be understood that, in this embodiment of this disclosure, the third information is sent, so that the terminal may optimize to-be-reported terminal capability signaling when learning that the network supports terminal capability signaling optimization, thereby avoiding reporting an entirety of terminal capability information and reducing overheads caused by terminal capability reporting. When the network does not support terminal capability signaling optimization, the terminal may not report capability identification information, and does not enable a capability identification information reporting policy, thereby reducing overheads of the terminal.

The following describes in detail some specific embodiments of this disclosure with reference to FIG. 7 to FIG. 11.

Figure 7:
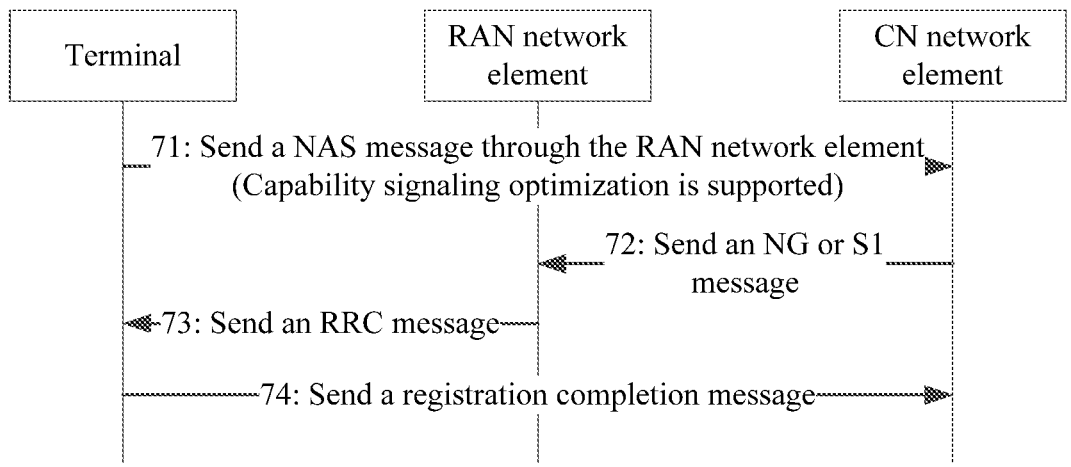
FIG. 7 is a flowchart 1 of a reporting process according to an embodiment of this disclosure.

As shown in FIG. 7, an embodiment of this disclosure mainly describes a process in which a terminal reports a capability for capability signaling optimization to a CN network element. As shown in FIG. 7, the corresponding reporting process may include the following steps.

Step 71: The terminal sends a NAS message (for example, a registration request message) to the CN network element through a RAN network element. The NAS message may include first information.

It can be understood that the first information may be described in the embodiment of FIG. 1.

For example, in this embodiment, the first information may indicate that the terminal supports capability signaling optimization.

The CN network element may be one of the following: an AMF, a PCF, a PCRF, an OAM, a capability management function network element, and the like. The CN network element may perform an operation of terminal capability signaling optimization based on the first information.

Step 72: The CN network element sends an NG message or an S1 message to the RAN network element, where the NG message or the S1 message may include a NAS message (for example, a registration acceptance message) and the first information.

The CN network element may perform an operation of terminal capability signaling optimization based on the first information, as described in the embodiment of FIG. 2. For example, the first information may indicate that the terminal supports capability signaling optimization.

Step 73: The RAN network element sends an RRC message to the terminal, where the RRC message may include a registration accept message, to complete a registration process of the terminal.

Step 74: The terminal sends a registration completion message to the CN network element through the RAN network element.

Figure 8:
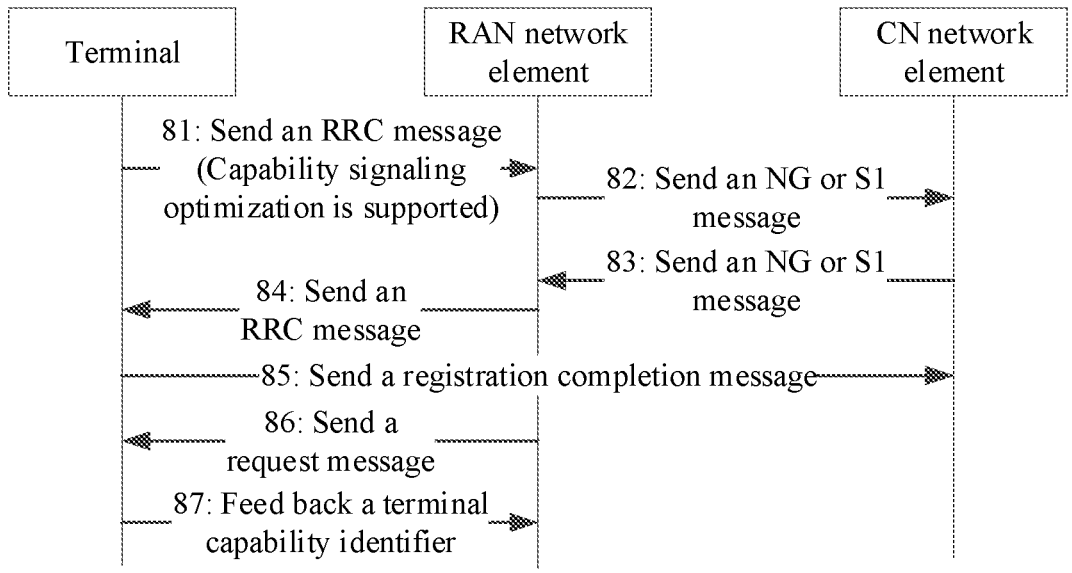
FIG. 8 is a flowchart 2 of a reporting process according to an embodiment of this disclosure.

As shown in FIG. 8, an embodiment of this disclosure mainly describes a process in which a terminal reports a capability for capability signaling optimization to a RAN network element. As shown in FIG. 8, the corresponding reporting process may include the following steps.

Step 81: The terminal sends an RRC message to the RAN network element, where the RRC message may be, for example, a registration request message, and the RRC message may include first information.

It can be understood that the first information may be described in the embodiment of FIG. 1.

For example, in this embodiment, the first information may indicate that the terminal supports capability signaling optimization.

Step 82: The RAN network element sends an NG message or an S1 message to a CN network element, where the NG message or the S1 message may include a registration request message and the first information.

The CN network element may be one of the following: an AMF, a PCF, a PCRF, an OAM, a capability management function network element, and the like. The CN network element may perform an operation of terminal capability signaling optimization based on the first information. For example, the first information may include that the terminal supports capability signaling optimization.

Step 83: The CN network element sends an NG or S1 message (for example, an initial context setup request message) to the RAN network element, where the NG or S1 message includes a registration accept message and the first information.

Step 84: The RAN network element sends an RRC message to the terminal, where the RRC message may include the registration accept message, to complete a registration process of the terminal.

Step 85: The terminal sends a registration completion message to the CN network element through the RAN network element.

Step 86: Subsequently, the RAN network element may send, to the terminal, a request message for obtaining terminal capability identification information.

Step 87: The terminal feeds back the terminal capability identification information to the RAN network element.

Figure 9:
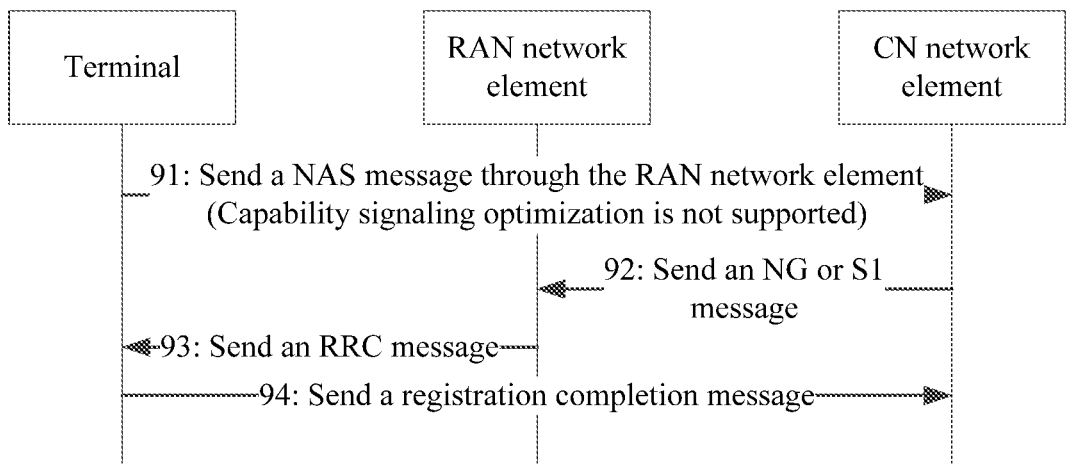
FIG. 9 is a flowchart 1 of a notification process according to an embodiment of this disclosure.

As shown in FIG. 9, an embodiment of this disclosure mainly describes a process in which a terminal notifies a CN network element of a change of a capability for capability signaling optimization. As shown in FIG. 9, the corresponding notification process may include the following steps.

Step 91: The terminal sends a NAS message (for example, a registration request message) to the CN network element through a RAN network element. The NAS message may include first information.

It can be understood that the first information may be described in the embodiment of FIG. 1. The CN network element may be one of the following: an AMF, a PCF, a PCRF, an OAM, a capability management function network element, and the like. The CN network element may perform an operation of terminal capability signaling optimization based on the first information.

In this embodiment, the first information may indicate that the terminal does not support capability signaling optimization. A capability of the terminal for capability signaling optimization changes from being supported to being not supported.

Step 92: The CN network element sends an NG message or an S1 message to the RAN network element, where the NG message or the S1 message may include at least one of the following: a NAS message (for example, a registration accept message) and the first information.

The CN network element may perform an operation of terminal capability signaling optimization based on the first information (the terminal does not support capability signaling optimization). For example, capability identification information of the terminal needs to be deleted or suspended.

Step 93: The RAN network element sends an RRC message to the terminal, where the RRC message may include at least one of the following: a NAS message (for example, a registration accept message) and indication information for deleting or suspending terminal capability identification information. After receiving the indication information, the terminal may suspend or delete a terminal capability identifier.

Step 94: The terminal sends the NAS message (for example, the registration completion message) to the CN network element through the RAN network element.

Figure 10:
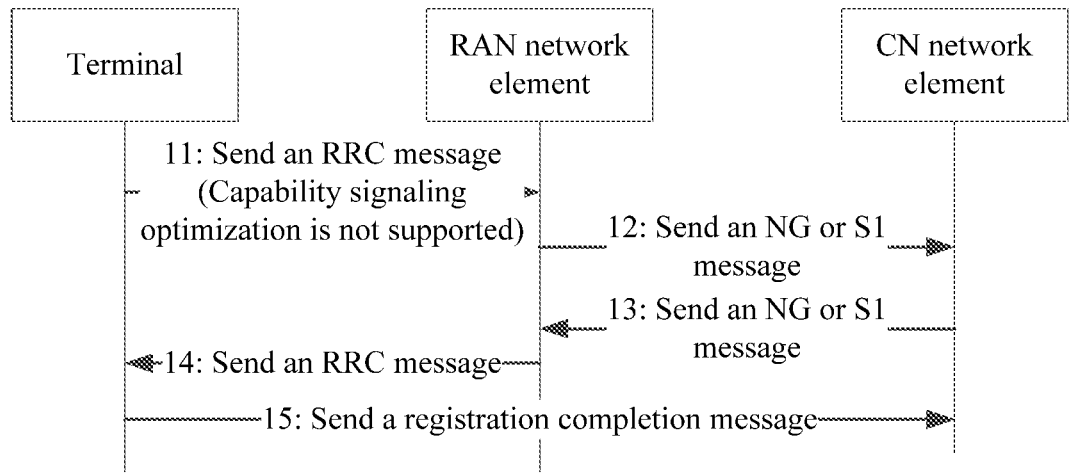
FIG. 10 is a flowchart 2 of a notification process according to an embodiment of this disclosure.

As shown in FIG. 10, an embodiment of this disclosure mainly describes a process in which a terminal notifies a RAN network element of a change of a capability for capability signaling optimization. As shown in FIG. 10, the corresponding notification process may include the following steps.

Step 11: The terminal sends an RRC message to the RAN network element, where the RRC message may be, for example, a registration request message, and the RRC message may include first information.

It can be understood that the first information may be described in the embodiment of FIG. 1.

For example, in this embodiment, the first information may include that the terminal does not support capability signaling optimization, and a capability of the terminal for capability signaling optimization changes from being supported to being not supported.

Step 12: The RAN network element sends an NG message or an S1 message to the CN network element, where the NG message or the SI message may include at least one of the following: a NAS message (a registration request message) and the first information.

The CN network element may be one of the following: an AMF, a PCF, a PCRF, an OAM, a capability management function network element, and the like. The CN network element may perform an operation of terminal capability signaling optimization based on the first information. For example, the first information may include that the terminal does not support capability signaling optimization.

Step 13: If identification information stored in a terminal context in the CN network element indicates that the terminal does not support capability signaling optimization, the CN network element may send an NG or S1 message (for example, an initial context setup request message), where the NG or SI message includes at least one of the following: the NAS message (the registration accept message) and the first information (for example, including that the terminal does not support capability signaling optimization).

Step 14: The RAN network element sends an RRC message to the terminal, where the RRC message may include at least one of the following: the NAS message (the registration accept message) and indication information for deleting or suspending terminal capability identification information.

After receiving the indication information, the terminal may suspend or delete a terminal capability identifier.

Step 15: The terminal sends a registration completion message to the CN network element through the RAN network element.

The foregoing embodiment describes the control method in this disclosure, and the following describes a terminal corresponding to the control method in this disclosure with reference to the embodiments and the drawings.

Figure 11:
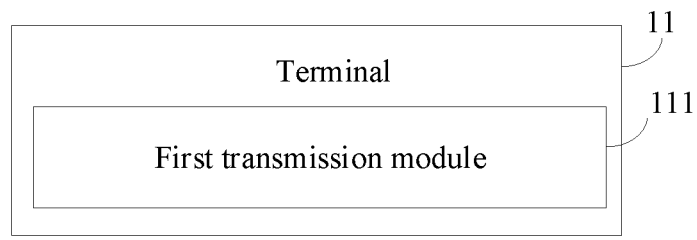
FIG. 11 is a schematic structural diagram 1 of a terminal according to an embodiment of this disclosure.

As shown in FIG. 11, an embodiment of this disclosure further provides a terminal 11, including:

a first transmission module 111, configured to send first information, where the first information includes at least one of the following: indication information of whether the terminal supports capability signaling optimization, and an RACS capability of the terminal.

Optionally, the first transmission module 111 may be specifically configured to: send the first information when a predetermined condition is met, where the predetermined condition includes at least one of the following: the terminal supports capability signaling optimization, the terminal changes from supporting capability signaling optimization to not supporting capability signaling optimization, the terminal changes from not supporting capability signaling optimization to supporting capability signaling optimization, the terminal has a capability for capability signaling optimization, a capability for capability signaling optimization the terminal changes, the terminal receives request information for obtaining a capability for capability signaling optimization, a capability of the terminal for capability signaling optimization is enabled, and a capability of the terminal for capability signaling optimization is disabled.

It can be understood that, in this embodiment of this disclosure, the first information is sent, so that the network-side network element can learn of whether the terminal supports capability signaling optimization, and the terminal may optimize to-be-reported terminal capability signaling when supporting capability signaling optimization, thereby avoiding reporting an entirety of terminal capability information and reducing overheads caused by terminal capability reporting.

Figure 12:
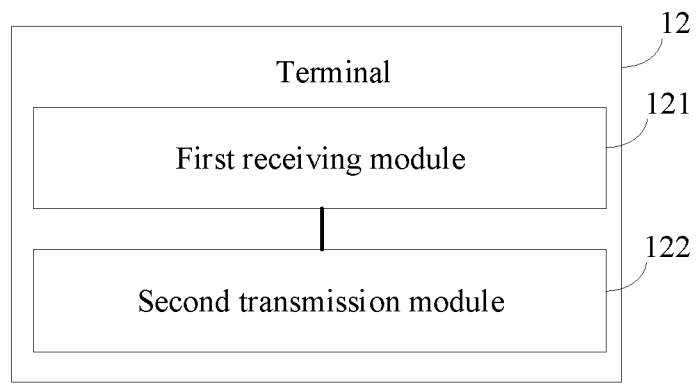
FIG. 12 is a schematic structural diagram 2 of a terminal according to an embodiment of this disclosure.

As shown in FIG. 12, an embodiment of this disclosure further provides a terminal 12, including:

a first receiving module 121, configured to receive first indication information; and a second transmission module 122, configured to send at least one of the following based on the first indication information: terminal capability identification information and first information, where the first indication information is used to request to obtain the terminal capability identification information, and the first information includes at least one of the following: indication information of whether the terminal supports capability signaling optimization, and an RACS capability of the terminal.

It should be noted that the first indication information may be described in the embodiment of FIG. 2.

The terminal capability identification information may be described in the embodiment of FIG. 2.

It can be understood that, in this embodiment of this disclosure, the terminal capability identification information and/or the first information are/is sent according to a network request, so that a network-side network element can learn of whether the terminal supports capability signaling optimization, and the terminal may optimize to-be-reported terminal capability signaling when supporting capability signaling optimization, thereby avoiding reporting an entirety of terminal capability information and reducing overheads caused by terminal capability reporting.

Figure 13:
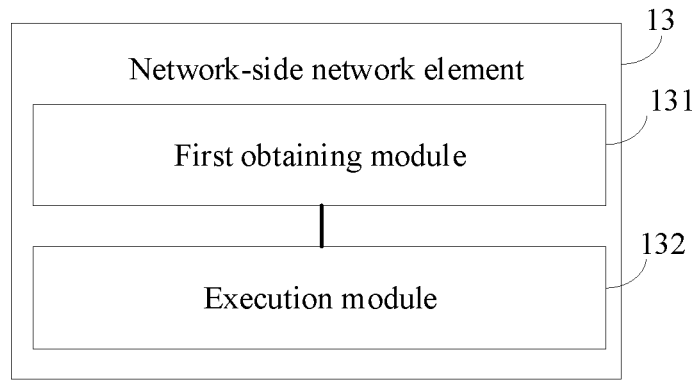
FIG. 13 is a schematic structural diagram 1 of a network-side network element according to an embodiment of this disclosure.

As shown in FIG. 13, an embodiment of this disclosure further provides a network-side network element 13, including:

a first obtaining module 131, configured to obtain first information, where the first information includes at least one of the following: indication information of whether a terminal supports capability signaling optimization, and an RACS capability of the terminal; and an execution module 132, configured to perform an operation of terminal capability signaling optimization based on the first information.

Optionally, the execution module 132 is specifically configured to:

allocate terminal capability identification information to the terminal;

send first indication information to a first target end, where the first indication information is used to request to obtain terminal capability identification information;

delete or suspend terminal capability identification information;

resume terminal capability identification information for the terminal;

send indication information for deleting or suspending terminal capability identification information to a second target end; or send the first information to a third target end.

It can be understood that an operation specifically executed by the execution module 132 may be described in the embodiment of FIG. 3.

It can be understood that, in this embodiment of this disclosure, the network-side network performs the operation of terminal capability signaling optimization based on the first information, so that the terminal may optimize to-be-reported terminal capability signaling when supporting capability signaling optimization, thereby avoiding reporting an entirety of terminal capability information and reducing overheads caused by terminal capability reporting.

Figure 14:
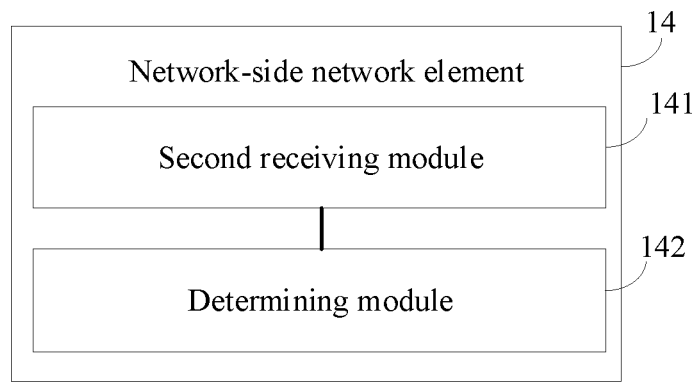
FIG. 14 is a schematic structural diagram 2 of a network-side network element according to an embodiment of this disclosure.

As shown in FIG. 14, an embodiment of this disclosure further provides a network-side network element 14, including:

a second receiving module 141, configured to receive response information for obtaining terminal capability identification information; and a determining module 142, configured to determine, based on the response information for obtaining the terminal capability identification information, whether the terminal supports RACS, or whether the terminal has an RACS capability.

It should be noted that the response information for obtaining the terminal capability identification information may be described in the embodiment of FIG. 4, and may include at least one of the following: terminal capability identification information and terminal capability information.

Optionally, the network-side network element 14 may further include:

a fourth transmission module, configured to send request information for obtaining the terminal capability identification information.

Optionally, the determining module 142 is specifically configured to:

when the response information for obtaining the terminal capability identification information includes the terminal capability identification information, determine that the terminal supports RACS or has the RACS capability; or when the response information for obtaining the terminal capability identification information does not include the terminal capability identification information, determine that the terminal does not support RACS or does not have the RACS capability.

It can be understood that, in this embodiment of this disclosure, the response information of the terminal can assist the network in learning of whether the terminal supports RACS.

Figure 15:
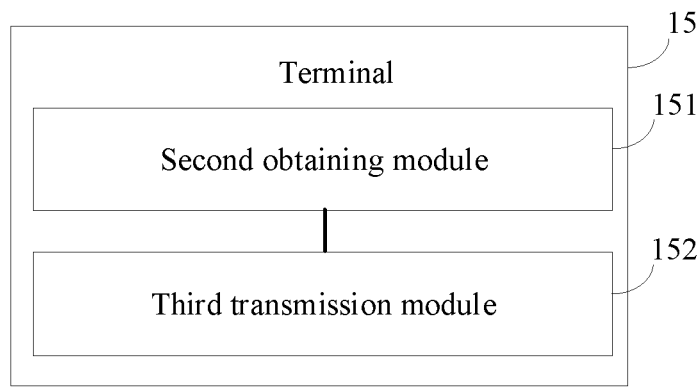
FIG. 15 is a schematic structural diagram 3 of a terminal according to an embodiment of this disclosure.

As shown in FIG. 15, an embodiment of this disclosure further provides a terminal 15, including:

a second obtaining module 151, configured to obtain third information; and a third transmission module 152, configured to send terminal capability identification information based on the third information, where the third information includes at least one of the following: indication information of whether a network supports terminal capability signaling optimization, indication information of whether a radio access network RAN network element supports terminal capability signaling optimization, and indication information of whether a core network CN network element supports terminal capability signaling optimization.

It should be noted that the terminal capability identification information may be described in the embodiment of FIG. 5, and may include at least one of the following: terminal capability identification information, type information of capability identification information, and terminal capability information to which the capability identification information is mapped.

It can be understood that, in this embodiment of this disclosure, the terminal capability identification information is sent based on the third information, so that the terminal may optimize to-be-reported terminal capability signaling when learning that the network supports terminal capability signaling optimization, thereby avoiding reporting an entirety of terminal capability information and reducing overheads caused by terminal capability reporting. When the network does not support terminal capability signaling optimization, the terminal may not report capability identification information, and does not enable a capability identification information reporting policy, thereby reducing overheads of the terminal.

Figure 16:
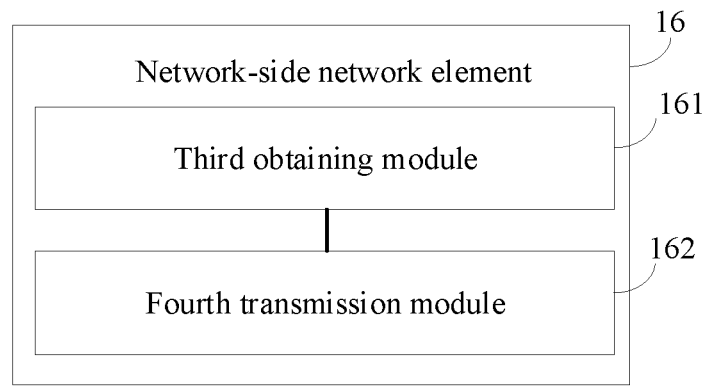
FIG. 16 is a schematic structural diagram 3 of a network-side network element according to an embodiment of this disclosure.

As shown in FIG. 16, an embodiment of this disclosure further provides a network-side network element 16, including:

a third obtaining module 161, configured to obtain second information; and a fourth transmission module 162, configured to send third information based on the second information, where the second information includes at least one of the following: indication information of whether a RAN network element supports terminal capability signaling optimization, and indication information of whether a CN network element supports terminal capability signaling optimization; and the third information includes at least one of the following: indication information of whether a network supports terminal capability signaling optimization, indication information of whether the RAN network element supports terminal capability signaling optimization, and indication information of whether the CN network element supports terminal capability signaling optimization.

Optionally, when the indication information of whether the network supports terminal capability signaling optimization indicates that the network supports terminal capability signaling optimization, that the network supports terminal capability signaling optimization may include any one of the following: the RAN network element supports terminal capability signaling optimization, the CN network element supports terminal capability signaling optimization, and both the RAN network element and the CN network element support terminal capability signaling optimization.

Optionally, when the network-side network element is the RAN network element, the RAN network element may send the third information by using a broadcast message; or when the network-side network element is the RAN network element, the RAN network element may obtain, from the CN network element, indication information of whether the CN network element supports terminal capability signaling optimization; or when the network-side network element is the CN network element, the CN network element may send the third information to a terminal during access of the terminal.

It can be understood that, in this embodiment of this disclosure, the third information is sent, so that the terminal may optimize to-be-reported terminal capability signaling when learning that the network supports terminal capability signaling optimization, thereby avoiding reporting an entirety of terminal capability information and reducing overheads caused by terminal capability reporting. When the network does not support terminal capability signaling optimization, the terminal may not report capability identification information, and does not enable a capability identification information reporting policy, thereby reducing overheads of the terminal.

An embodiment of this disclosure further provides a terminal, including: a processor, a memory, and a computer program that is stored in the memory and is capable of running on the processor. When the computer program is executed by the processor, processes in the foregoing embodiments of the control method applied to a terminal are implemented, and a same technical effect can be achieved. To avoid repetition, details are not described herein again.

Figure 17:
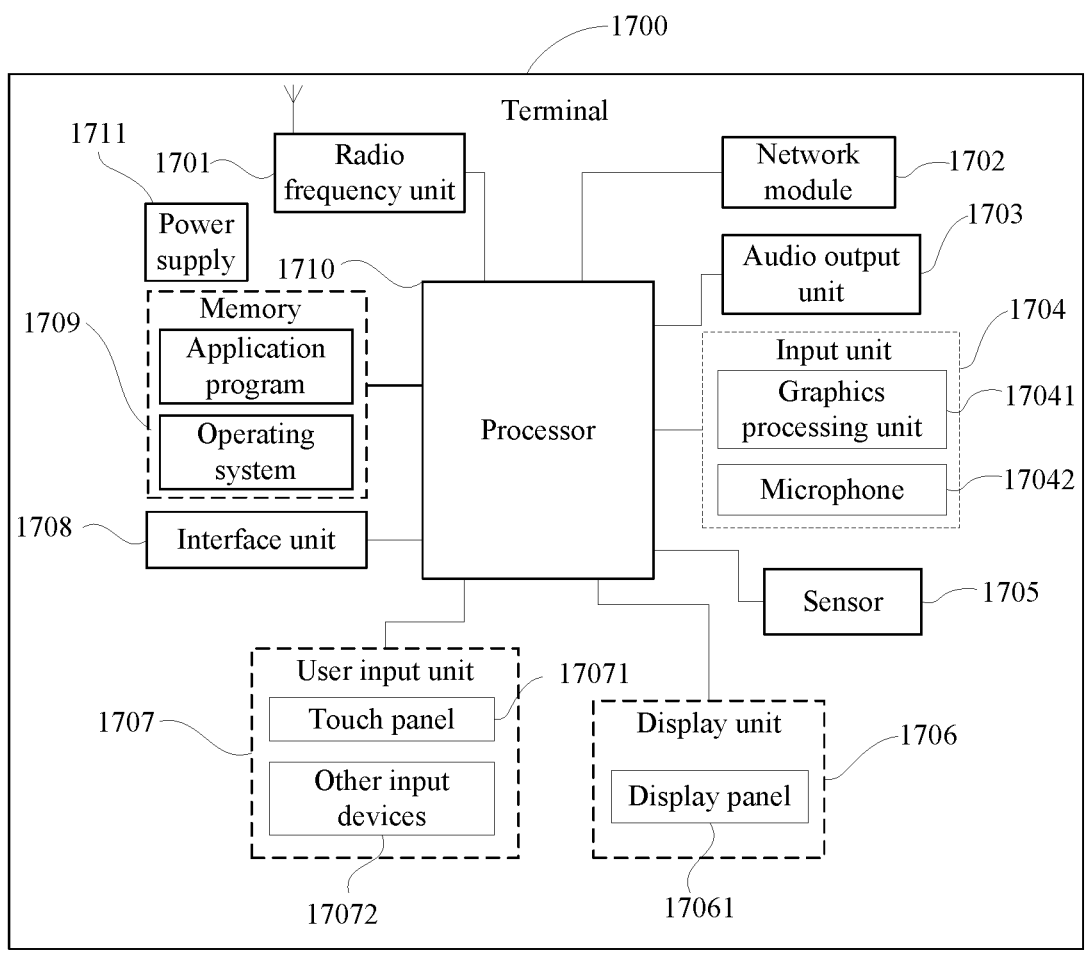
FIG. 17 is a schematic structural diagram 4 of a terminal according to an embodiment of this disclosure.

Specifically, FIG. 17 is a schematic diagram of a hardware structure of a terminal for implementing the embodiments of this disclosure. The terminal 1700 includes but is not limited to components such as a radio frequency unit 1701, a network module 1702, an audio output unit 1703, an input unit 1704, a sensor 1705, a display unit 1706, a user input unit 1707, an interface unit 1708, a memory 1709, a processor 1710, and a power supply 1711. A person skilled in the art may understand that the structure of the terminal shown in FIG. 17 does not constitute a limitation on the terminal. The terminal may include more or fewer components than those shown in the figure, or some components are combined, or component arrangements are different. In this embodiment of the present disclosure, the terminal includes but is not limited to a mobile phone, a tablet computer, a notebook computer, a palmtop computer, an in-vehicle terminal, a wearable device, a pedometer, or the like.

The radio frequency unit 1701 is configured to send first information, where the first information includes at least one of the following: indication information of whether the terminal supports capability signaling optimization, and a capability of the terminal for capability signaling optimization;

or the radio frequency unit 1701 is configured to receive first indication information, and send at least one of the following based on the first indication information: terminal capability identification information and first information, where the first indication information is used to request to obtain the terminal capability identification information, and the first information includes at least one of the following: indication information of whether the terminal supports capability signaling optimization, and a capability of the terminal for capability signaling optimization;

or the processor 1710 is configured to obtain third information; and the radio frequency unit 1701 is configured to send the terminal capability identification information based on the third information, where the third information includes at least one of the following: indication information of whether a network supports terminal capability signaling optimization, indication information of whether a radio access network RAN network element supports terminal capability signaling optimization, and indication information of whether a core network CN network element supports terminal capability signaling optimization.

It can be understood that, in this embodiment of this disclosure, the terminal may optimize to-be-reported terminal capability signaling when supporting capability signaling optimization, thereby avoiding reporting an entirety of terminal capability information and reducing overheads caused by terminal capability reporting.

It should be understood that in this embodiment of this disclosure, the radio frequency unit 1701 may be configured to: receive and send signals in an information receiving/sending process or a call process; and specifically, after receiving downlink data from a base station, send the downlink data to the processor 1710 for processing, and, send uplink data to the base station. Generally, the radio frequency unit 1701 includes but is not limited to an antenna, at least one amplifier, a transceiver, a coupler, a low noise amplifier, a duplexer, and the like. In addition, the radio frequency unit 1701 may further communicate with a network and another device through a wireless communications system.

The terminal provides wireless broadband Internet access for a user by using the network module 1702, for example, helping the user to send and receive e-mails, to browse web pages, and to access streaming media.

The audio output unit 1703 may convert audio data received by the radio frequency unit 1701 or the network module 1702 or stored in the memory 1709 into an audio signal and output the audio signal as a sound. In addition, the audio output unit 1703 may further provide audio output (for example, a call signal reception tone or a message reception tone) that is related to a specific function performed by the terminal 1700. The audio output unit 1703 includes a speaker, a buzzer, a telephone receiver, and the like.

The input unit 1704 is configured to receive an audio or video signal. The input unit 1704 may include a graphics processing unit (Graphics Processing Unit, GPU) 17041 and a microphone 17042, and the graphics processing unit 17041 processes image data of a static picture or a video obtained by an image capture apparatus (for example, a camera) in an image capture mode or a video capture mode. A processed image frame may be displayed on the display unit 1706. An image frame processed by the graphics processing unit 17041 may be stored in the memory 1709 (or another storage medium) or sent by the radio frequency unit 1701 or the network module 1702. The microphone 17042 can receive a sound and can process the sound into audio data. The processed audio data can be converted, for outputting, into a format that can be sent to a mobile communication base station through the radio frequency unit 1701 in a telephone call mode.

The terminal 1700 further includes at least one sensor 1705, for example, an optical sensor, a motion sensor, and another sensor. Specifically, the optical sensor includes an ambient light sensor and a proximity sensor. The ambient light sensor may adjust brightness of a display panel 17061 based on intensity of ambient light. When the terminal 1700 moves near an ear, the proximity sensor may disable the display panel 17061 and/or backlight. As a motion sensor, an accelerometer sensor may detect for a value of an acceleration in various directions (there are usually three axes), may detect for a value and a direction of gravity when the terminal is static, and may be configured to recognize a posture of the terminal (for example, landscape/portrait mode switching, a related game, or magnetometer posture calibration), provide a function related to vibration recognition (for example, a pedometer or a keystroke), or the like. The sensor 1705 may further include a fingerprint sensor, a pressure sensor, an iris sensor, a molecular sensor, a gyroscope, a barometer, a hygrometer, a thermometer, or an infrared sensor. Details are not described herein.

The display unit 1706 is configured to display information input by the user or information provided for the user. The display unit 1706 may include a display panel 17061, and the display panel 17061 may be configured in the form of a liquid crystal display (Liquid Crystal Display, LCD), an organic light-emitting diode (Organic Light-Emitting Diode, OLED), or the like.

The user input unit 1707 may be configured to receive input digit or character information, and generate a key signal input related to a user setting and function control of the terminal. Specifically, the user input unit 1707 includes a touch panel 17071 and other input devices 17072. The touch panel 17071 is also referred to as a touchscreen, and may collect a touch operation of the user on or near the touch panel (for example, an operation performed on or near the touch panel 17071 by the user by using any appropriate object or accessory such as a finger or a stylus). The touch panel 17071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 1710, and receives and executes a command sent by the processor 1710. In addition, the touch panel 17071 may be implemented in a plurality of forms, for example, as a resistive, capacitive, infrared, or surface acoustic wave touch panel. The user input unit 1707 may further include other input devices 17072 in addition to the touch panel 17071. Specifically, the other input devices 17072 may include but are not limited to a physical keyboard, a function key (such as a volume control key or a power on/off key), a trackball, a mouse, a joystick, and the like. Details are not described herein.

Further, the touch panel 17071 may cover the display panel 17061. After detecting a touch operation on or near the touch panel 17071, the touch panel 11071 transmits the touch operation to the processor 1710 to determine a type of a touch event. Then the processor 1710 provides corresponding visual output on the display panel 17061 based on the type of the touch event. In FIG. 17, the touch panel 17071 and the display panel 17061 serve as two independent components to implement input and output functions of the terminal. However, in some embodiments, the touch panel 17071 and the display panel 17061 may be integrated to implement the input and output functions of the terminal. This is not specifically limited herein.

The interface unit 1708 is an interface for connecting an external apparatus to the terminal 1700. For example, the external apparatus may include a wired or wireless headphone port, an external power (or battery charger) port, a wired or wireless data port, a memory card port, a port for connecting an apparatus having a recognition module, an audio input/output (I/O) port, a video I/O port, an earphone port, and the like. The interface unit 1708 may be configured to receive input (for example, data information and electric power) from the external apparatus, and transmit the received input to one or more elements in the terminal 1700; or may be configured to transmit data between the terminal 1700 and the external apparatus.

The memory 1709 may be configured to store a software program and various data. The memory 1709 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 1709 may include a high-speed random access memory, or may include a non-volatile memory, for example, at least one magnetic disk storage device, a flash memory device, or other volatile solid-state storage devices.

The processor 1710 is a control center of the terminal, connects various parts of the entire terminal by using various interfaces and lines, and executes various functions and data processing of the terminal by running or executing a software program and/or a module stored in the memory 1709 and invoking data stored in the memory 1709, so as to perform overall monitoring on the terminal. The processor 1710 may include one or more processing units. Optionally, the processor 1710 may integrate an application processor and a modem processor. The application processor mainly processes an operating system, a user interface, an application program, and the like. The modem processor mainly processes wireless communication. It may be understood that the modem processor may alternatively not be integrated into the processor 1710.

The terminal 1700 may further include a power supply 1711 (for example, a battery) that supplies power to each component. Optionally, the power supply 1711 may be logically connected to the processor 1710 by using a power management system, so as to implement functions such as charging management, discharging management, and power consumption management by using the power management system.

In addition, the terminal 1700 may further include some functional modules that are not shown. Details are not described herein.

An embodiment of this disclosure further provides a network-side network element, including a processor, a memory, and a computer program stored in the memory and capable of running on the processor, where when the computer program is executed by the processor, the procedures of the foregoing embodiments of the control method applied to the network-side network element are implemented, with the same technical effects achieved. To avoid repetition, details are not described herein again.

Figure 18:
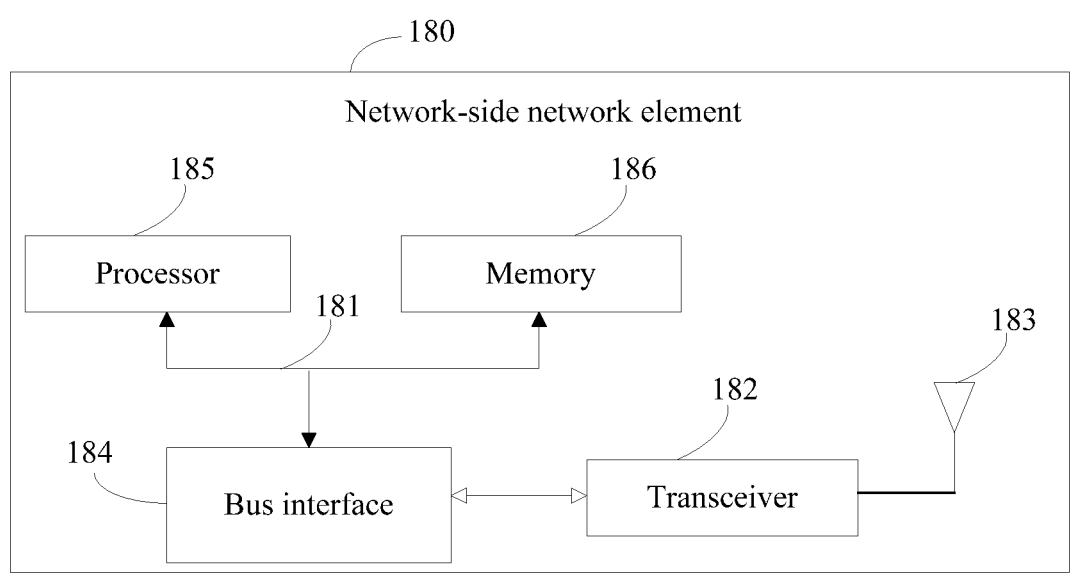
FIG. 18 is a schematic structural diagram 4 of a network-side network element according to an embodiment of this disclosure.

Specifically, FIG. 18 is a schematic diagram of a hardware structure of a network-side network element that implements various embodiments of this disclosure. The network-side network element 180 includes but is not limited to: a bus 181, a transceiver 182, an antenna 183, a bus interface 184, a processor 185, and a memory 186.

In this embodiment of this disclosure, the network-side network element 180 further includes: a computer program stored on the memory 186 and capable of running on the processor 185. When the computer program is executed by the processor 185, the following steps may be implemented:

obtaining first information, where the first information includes at least one of the following: indication information of whether a terminal supports capability signaling optimization, and a capability of the terminal for capability signaling optimization; and performing an operation of terminal capability signaling optimization based on the first information.

Alternatively, when the computer program is executed by the processor 185, the following steps may be implemented:

receiving response information for obtaining terminal capability identification information; and determining, based on the response information for obtaining the terminal capability identification information, whether the terminal supports capability signaling optimization, or whether the terminal has a capability for capability signaling optimization.

Alternatively, when the computer program is executed by the processor 185, the following steps may be implemented:

obtaining second information; and sending third information based on the second information, where the second information includes at least one of the following: indication information of whether a RAN network element supports terminal capability signaling optimization, and indication information of whether a CN network element supports terminal capability signaling optimization; and the third information includes at least one of the following: indication information of whether a network supports terminal capability signaling optimization, indication information of whether the RAN network element supports terminal capability signaling optimization, and indication information of whether the CN network element supports terminal capability signaling optimization.

The transceiver 182 is configured to receive and send data under control of the processor 185.

In FIG. 18, in a bus architecture (represented by the bus 181), the bus 181 may include any quantity of interconnected buses and bridges, and the bus 181 connects various circuits that include one or more processors represented by the processor 185 and a memory represented by the memory 186. The bus 181 may further interconnect various other circuits such as a peripheral device, a voltage regulator, and a power management circuit. These are all well known in the art, and therefore are not further described in this specification. The bus interface 184 provides an interface between the bus 181 and the transceiver 182. The transceiver 182 may be one element, or may be a plurality of elements, for example, a plurality of receivers and transmitters, and provides a unit for communicating with various other apparatuses on a transmission medium. Data processed by the processor 185 is transmitted on a wireless medium through the antenna 183. Further, the antenna 183 receives data and transmits the data to the processor 185.

The processor 185 is responsible for managing the bus 181 and general processing, and may further provide various functions, including timing, a peripheral interface, voltage regulation, power management, and other control functions. However, the memory 186 may be configured to store data that the processor 185 uses when performing an operation.

Optionally, the processor 185 may be a CPU, an ASIC, an FPGA, or a CPLD.

An embodiment of this disclosure further provides a computer-readable storage medium, where the computer-readable storage medium stores a computer program, and when the computer program is executed by a processor, the procedures of the foregoing control method embodiments are implemented, with the same technical effects. To avoid repetition, details are not described herein again. For example, the computer-readable storage medium is a read-only memory (Read-Only Memory, ROM for short), a random access memory (Random Access Memory, RAM for short), a magnetic disk, an optical disc, or the like.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network-side network element, or the like) to perform the methods described in the embodiments of this disclosure. The hardware in this disclosure includes but is not limited to an electronic circuit, a programmable logic device, a processor, a programmable processor, an application-specific integrated circuit, and the like.

The foregoing describes the embodiments of this disclosure with reference to the accompanying drawings. However, this disclosure is not limited to the foregoing specific implementations. The foregoing specific implementations are merely illustrative rather than restrictive. As instructed by this disclosure, persons of ordinary skill in the art may develop many other manners without departing from principles of this disclosure and the protection scope of the claims, and all such manners fall within the protection scope of this disclosure.

The invention claimed is:

1. A control method, applied to a terminal and comprising:
sending first information, wherein
the first information comprises indication information of whether the terminal supports capability signaling optimization,
wherein, the capability signaling optimization comprises identifying a set of terminal capabilities or a complete terminal capability by using terminal capability identification information;
the method further comprises, after sending first information, at least one of the following steps:
receiving terminal capability identification information allocated by a network-side network element; or
receiving first indication information, and sending the terminal capability identification information based on the first indication information, wherein the first indication information is used to request the terminal capability identification information.

2. The control method according to claim 1, wherein the sending first information comprises:
sending the first information when a predetermined condition is met, wherein
the predetermined condition comprises at least one of the following: the terminal supports capability signaling optimization, the terminal changes from supporting capability signaling optimization to not supporting capability signaling optimization, the terminal changes from not supporting capability signaling optimization to supporting capability signaling optimization, the terminal has the capability for capability signaling optimization, a capability of the terminal for capability signaling optimization changes, the terminal receives request information for obtaining the capability for capability signaling optimization, a capability of the terminal for capability signaling optimization is enabled, or a capability of the terminal for capability signaling optimization is disabled.

3. The control method according to claim 1, wherein the first indication information comprises at least one of the following:
indication information of whether to obtain capability identification information, type information of the capability identification information, indication information of whether to obtain the capability identification information and terminal capability information, or indication information of whether to obtain the terminal capability information.

4. The control method according to claim 3, wherein the type information of the capability identification information comprises at least one of the following:
information of a card slot corresponding to the capability identification information, information of a card corresponding to the capability identification information, information of a serving network corresponding to the capability identification information, or network type information of the capability identification information.

5. The control method according to claim 4, wherein the information of the card slot corresponding to the capability identification information comprises at least one of the following: identification information of a card slot, a serial number of the card slot, information of a first card slot, information of a second card slot, indication information of a primary card slot or a secondary card slot, indication information of whether a capability is applicable to all card slots, or indication information of whether a capability is indiscriminate between card slots.

6. The control method according to claim 4, wherein the information of the card corresponding to the capability identification information comprises at least one of the following: a serial number of a card, a serial number of a card slot in which the card is located, indication information of a primary card or a secondary card, indication information of whether a capability is applicable to all cards, or indication information of whether a capability is indiscriminate between cards.

7. The control method according to claim 4, wherein the information of the serving network corresponding to the capability identification information comprises at least one of the following: network identification information of a serving network, indication information of whether capability identification is applicable to all serving networks, or indication information of whether the capability identification information is indiscriminate between serving networks.

8. The control method according to claim 4, wherein the network type information corresponding to the capability identification information comprises at least one of the following: a network type, indication information of whether the capability identification information is applicable to all network types, or indication information of whether the capability identification information is indiscriminate between network types.

9. The control method according to claim 1, wherein the terminal capability identification information comprises at least one of the following:
terminal capability identifier, type information of capability identification information, or terminal capability information to which the capability identification information is mapped.

10. The control method according to claim 9, wherein the sending terminal capability identification information comprises at least one of the following:
when the indication information of whether to obtain the capability identification information indicates to obtain the capability identification information, sending the terminal capability identification information and/or a terminal capability to which the terminal capability identification information is mapped;
when the indication information of whether to obtain the capability identification information indicates not to obtain the capability identification information, sending the terminal capability information;
when the indication information of whether to obtain the capability identification information and the terminal capability information indicates to obtain the capability identification information and the terminal capability information, sending the terminal capability identification information and/or the terminal capability information;
sending, based on the type information of the capability identification information, the terminal capability identification information corresponding to the type information of the capability identification information; or
when the indication information of whether to obtain the terminal capability information indicates to obtain the terminal capability information, sending the terminal capability information and/or the terminal capability identification information to which the terminal capability information is mapped.

11. A control method, applied to a network-side network element and comprising:
obtaining first information, wherein the first information comprises indication information of whether a terminal supports capability signaling optimization; and
performing an operation of terminal capability signaling optimization based on the first information, wherein the capability signaling optimization comprises identifying a set of terminal capabilities or a complete terminal capability by using terminal capability identification information;
wherein the performing an operation of terminal capability signaling optimization comprises at least one of the following:
allocating terminal capability identification information to the terminal:
sending first indication information to a first target end, wherein the first indication information is used to request to obtain terminal capability identification information;
deleting or suspending terminal capability identification information;
resuming terminal capability identification information for the terminal;
sending indication information for deleting or suspending terminal capability identification information to a second target end; or
sending the first information to a third target end.

12. The control method according to claim 11, wherein
the allocating terminal capability identification information to the terminal comprises:
when the terminal meets a first condition, allocating the terminal capability identification information to the terminal;
and/or,
the sending indication information for obtaining terminal capability identification information to a first target end comprises:
when the terminal meets a first condition, sending the indication information for obtaining the terminal capability identification information to the first target end;
and/or,
the deleting or suspending terminal capability identification information comprises:
when the terminal meets a second condition, deleting or suspending the terminal capability identification information;
and/or,
the sending indication information for deleting or suspending terminal capability identification information to a second target end comprises:
when the terminal meets a second condition, sending the indication information for deleting or suspending the terminal capability identification information to the second target end;
and/or,
the resuming terminal capability identification information for the terminal comprises:
when the terminal meets a third condition, resuming the terminal capability identification information for the terminal;
and/or,
the sending the first information to a third target end comprises:
when the terminal meets a fourth condition, sending the first information to the third target end, wherein
the first condition comprises at least one of the following:
the terminal supports capability signaling optimization, the terminal has a capability for capability signaling optimization, no terminal capability identification information exists, a capability of the terminal for capability signaling optimization changes from being not supported to being supported, or a capability of the terminal for capability signaling optimization is enabled;
the second condition comprises at least one of the following: a capability of the terminal for capability signaling optimization changes from being supported to being not supported, or a capability of the terminal for capability signaling optimization is disabled;
the third condition comprises at least one of the following: a capability of the terminal for capability signaling optimization changes from being not supported to being supported, or a capability of the terminal for capability signaling optimization is enabled; and
the fourth condition comprises at least one of the following: the terminal supports capability signaling optimization, the terminal has a capability for capability signaling optimization, or a capability of the terminal for capability signaling optimization changes.

13. The control method according to claim 11, wherein the method further comprises:

receiving response information for obtaining terminal capability identification information; and
determining, based on the response information for obtaining the terminal capability identification information, whether the terminal supports capability signaling optimization.

14. The control method according to claim 11, wherein the terminal capability identification information comprises at least one of the following:
terminal capability identifier, type information of capability identification information, or terminal capability information to which the capability identification information is mapped.

15. A terminal, comprising: a memory, a processor, and a computer program that is stored in the memory and capable of running on the processor, wherein when the computer program is executed by the processor, the following steps are implemented:
sending first information, wherein
the first information comprises indication information of whether the terminal supports capability signaling optimization,
wherein, the capability signaling optimization comprises identifying a set of terminal capabilities or a complete terminal capability by using terminal capability identification information.

16. The terminal according to claim 15, wherein the first indication information comprises at least one of the following:
indication information of whether to obtain capability identification information, type information of the capability identification information, indication information of whether to obtain the capability identification information and terminal capability information, or indication information of whether to obtain the terminal capability information.

17. The terminal according to claim 16, wherein the type information of the capability identification information comprises at least one of the following:
information of a card slot corresponding to the capability identification information, information of a card corresponding to the capability identification information, information of a serving network corresponding to the capability identification information, or network type information of the capability identification information.

18. The terminal according to claim 17, wherein the information of the card slot corresponding to the capability identification information comprises at least one of the following: identification information of a card slot, a serial number of the card slot, information of a first card slot, information of a second card slot, indication information of a primary card slot or a secondary card slot, indication information of whether a capability is applicable to all card slots, or indication information of whether a capability is indiscriminate between card slots.

19. The control method according to claim 17, wherein the information of the card corresponding to the capability identification information comprises at least one of the following: a serial number of a card, a serial number of a card slot in which the card is located, indication information of a primary card or a secondary card, indication information of whether a capability is applicable to all cards, or indication information of whether a capability is indiscriminate between cards.

20. The control method according to claim 17, wherein the information of the serving network corresponding to the capability identification information comprises at least one of the following: network identification information of a serving network, indication information of whether capability identification is applicable to all serving networks, or indication information of whether the capability identification information is indiscriminate between serving networks.

* * * * *